US011092812B2

(12) United States Patent
Ng-Thow-Hing

(10) Patent No.: US 11,092,812 B2
(45) Date of Patent: Aug. 17, 2021

(54) AUGMENTED REALITY VIEWER WITH AUTOMATED SURFACE SELECTION PLACEMENT AND CONTENT ORIENTATION PLACEMENT

(71) Applicant: Magic Leap, Inc., Plantation, FL (US)

(72) Inventor: Victor Ng-Thow-Hing, Los Altos, CA (US)

(73) Assignee: Magic Leap, Inc., Plantation, FL (US)

(*) Notice: Subject to any disclaimer, the term of this patent is extended or adjusted under 35 U.S.C. 154(b) by 0 days.

(21) Appl. No.: 16/435,933

(22) Filed: Jun. 10, 2019

(65) Prior Publication Data
US 2019/0377192 A1 Dec. 12, 2019

Related U.S. Application Data

(60) Provisional application No. 62/682,788, filed on Jun. 8, 2018.

(51) Int. Cl.
*G09G 5/00* (2006.01)
*G02B 27/01* (2006.01)
(Continued)

(52) U.S. Cl.
CPC ..... *G02B 27/0179* (2013.01); *G02B 27/0172* (2013.01); *G06F 3/011* (2013.01);
(Continued)

(58) Field of Classification Search
CPC ...... G06F 3/011; G06F 3/017; G06F 3/04815; G06T 19/006; G02B 27/0172; G02B 2027/0141; G02B 27/0093
See application file for complete search history.

(56) References Cited

U.S. PATENT DOCUMENTS 4,344,092 A  8/1982 Miller
4,652,930 A  3/1987 Crawford
(Continued)

FOREIGN PATENT DOCUMENTS

EP  0535402 A1  4/1993
EP  1215522 A2  6/2002
(Continued)

OTHER PUBLICATIONS

Invitation to Pay Additional Fees, International PCT Patent Application No. PCT/US19/36275, (2 pages).
(Continued)

*Primary Examiner* — Weiming He
(74) *Attorney, Agent, or Firm* — Stephen M. De Klerk

(57) ABSTRACT

An augmented reality viewer is described. A user orientation determination module determines a user orientation. A content vector calculator calculates a content orientation vector relative to a near edge and a far edge of content, determines a dot product of the user orientation vector and the content orientation vector, and positions the content based on a magnitude of the dot product. A surface area vector calculator calculates a surface area orientation vector for each of a plurality of surface area. A surface selection module determines a dot product of the user orientation vector and each surface area orientation vector and selects a preferred surface based on the relative magnitude of the dot products.

7 Claims, 25 Drawing Sheets

(51) Int. Cl.
  *G06F 3/01* (2006.01)
  *G09G 5/373* (2006.01)
  *G09G 5/38* (2006.01)

(52) U.S. Cl.
  CPC .............. *G09G 5/373* (2013.01); *G09G 5/38* (2013.01); *G02B 2027/014* (2013.01); *G02B 2027/0187* (2013.01); *G09G 2340/0492* (2013.01)

(56) References Cited

U.S. PATENT DOCUMENTS

| | | |
|---|---|---|
| 4,810,080 A | 3/1989 | Grendol et al. |
| 4,997,268 A | 3/1991 | Dauvergne |
| 5,007,727 A | 4/1991 | Kahaney et al. |
| 5,074,295 A | 12/1991 | Willis |
| 5,240,220 A | 8/1993 | Elberbaum |
| 5,410,763 A | 5/1995 | Bolle |
| 5,455,625 A | 10/1995 | Englander |
| 5,495,286 A | 2/1996 | Adair |
| 5,497,463 A | 3/1996 | Stein et al. |
| 5,682,255 A | 10/1997 | Friesem et al. |
| 5,854,872 A | 12/1998 | Tai |
| 5,864,365 A | 1/1999 | Sramek et al. |
| 6,012,811 A | 1/2000 | Chao et al. |
| 6,016,160 A | 1/2000 | Coombs et al. |
| 6,076,927 A | 6/2000 | Owens |
| 6,117,923 A | 9/2000 | Amagai et al. |
| 6,124,977 A | 9/2000 | Takahashi |
| 6,191,809 B1 | 2/2001 | Hori et al. |
| 6,375,369 B1 | 4/2002 | Schneider et al. |
| 6,541,736 B1 | 4/2003 | Huang et al. |
| 6,757,068 B2 | 6/2004 | Foxlin |
| 7,431,453 B2 | 10/2008 | Hogan |
| 7,573,640 B2 | 8/2009 | Nivon et al. |
| 7,724,980 B1 | 5/2010 | Shenzhi |
| 7,751,662 B2 | 7/2010 | Kleemann |
| 7,758,185 B2 | 7/2010 | Lewis |
| 8,246,408 B2 | 8/2012 | Elliot |
| 8,353,594 B2 | 1/2013 | Lewis |
| 8,508,676 B2 | 8/2013 | Silverstein et al. |
| 8,619,365 B2 | 12/2013 | Harris et al. |
| 8,696,113 B2 | 4/2014 | Lewis |
| 8,733,927 B1 | 5/2014 | Lewis |
| 8,759,929 B2 | 6/2014 | Shiozawa et al. |
| 8,847,988 B2 | 9/2014 | Geisner et al. |
| 9,010,929 B2 | 4/2015 | Lewis |
| 9,095,437 B2 | 8/2015 | Boyden et al. |
| 9,239,473 B2 | 1/2016 | Lewis |
| 9,244,293 B2 | 1/2016 | Lewis |
| 9,581,820 B2 | 2/2017 | Robbins |
| 9,658,473 B2 | 5/2017 | Lewis |
| 9,671,566 B2 | 6/2017 | Abovitz et al. |
| 9,671,615 B1 | 6/2017 | Vallius et al. |
| 9,874,664 B2 | 1/2018 | Stevens et al. |
| 9,955,862 B2 | 5/2018 | Freeman et al. |
| 10,018,844 B2 | 7/2018 | Levola et al. |
| 10,151,937 B2 | 12/2018 | Lewis |
| 10,185,147 B2 | 1/2019 | Lewis |
| 10,218,679 B1 | 2/2019 | Jawahar |
| 10,551,879 B1 | 2/2020 | Richards et al. |
| 2001/0010598 A1 | 8/2001 | Aritake et al. |
| 2002/0063913 A1 | 5/2002 | Nakamura et al. |
| 2002/0071050 A1 | 6/2002 | Homberg |
| 2002/0122648 A1 | 9/2002 | Mule' et al. |
| 2002/0140848 A1 | 10/2002 | Cooper et al. |
| 2003/0048456 A1 | 3/2003 | Hill |
| 2003/0067685 A1 | 4/2003 | Niv |
| 2003/0077458 A1 | 4/2003 | Korenaga et al. |
| 2003/0219992 A1 | 11/2003 | Schaper |
| 2004/0001533 A1 | 1/2004 | Tran et al. |
| 2004/0021600 A1 | 2/2004 | Wittenberg |
| 2004/0042377 A1 | 3/2004 | Nikoloai et al. |
| 2004/0174496 A1 | 9/2004 | Ji et al. |
| 2004/0186902 A1 | 9/2004 | Stewart |
| 2004/0240072 A1 | 12/2004 | Schindler et al. |
| 2004/0246391 A1 | 12/2004 | Travis |
| 2005/0001977 A1 | 1/2005 | Zelman |
| 2005/0157159 A1 | 7/2005 | Komiya et al. |
| 2005/0273792 A1 | 12/2005 | Inohara et al. |
| 2006/0013435 A1 | 1/2006 | Rhoads |
| 2006/0015821 A1 | 1/2006 | Jacques Parker et al. |
| 2006/0038880 A1 | 2/2006 | Starkweather et al. |
| 2006/0050224 A1 | 3/2006 | Smith |
| 2006/0126181 A1 | 6/2006 | Levola |
| 2006/0132914 A1 | 6/2006 | Weiss et al. |
| 2006/0221448 A1 | 10/2006 | Nivon et al. |
| 2006/0228073 A1 | 10/2006 | Mukawa et al. |
| 2006/0250322 A1 | 11/2006 | Hall et al. |
| 2006/0268220 A1 | 11/2006 | Hogan |
| 2007/0058248 A1 | 3/2007 | Nguyen et al. |
| 2007/0159673 A1 | 7/2007 | Freeman et al. |
| 2007/0188837 A1 | 8/2007 | Shimizu et al. |
| 2007/0204672 A1 | 9/2007 | Huang et al. |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0043334 A1 | 2/2008 | Itzkovitch et al. |
| 2008/0063802 A1 | 3/2008 | Maula et al. |
| 2008/0068557 A1 | 3/2008 | Menduni et al. |
| 2008/0146942 A1 | 6/2008 | Dala-Krishna |
| 2008/0205838 A1 | 8/2008 | Crippa et al. |
| 2008/0316768 A1 | 12/2008 | Travis |
| 2009/0153797 A1 | 6/2009 | Allon et al. |
| 2009/0224416 A1 | 9/2009 | Laakkonen et al. |
| 2009/0245730 A1 | 10/2009 | Kleemann |
| 2009/0310633 A1 | 12/2009 | Ikegami |
| 2010/0019962 A1* | 1/2010 | Fujita ..................... G01S 19/14 342/357.57 |
| 2010/0056274 A1 | 3/2010 | Uusitalo et al. |
| 2010/0063854 A1 | 3/2010 | Purvis et al. |
| 2010/0079841 A1 | 4/2010 | Levola |
| 2010/0232016 A1 | 9/2010 | Landa et al. |
| 2010/0244168 A1 | 9/2010 | Shiozawa et al. |
| 2010/0296163 A1 | 11/2010 | Sarikko |
| 2011/0050655 A1 | 3/2011 | Mukawa |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0050535 A1 | 3/2012 | Densham et al. |
| 2012/0081392 A1* | 4/2012 | Arthur ............... H04N 5/23222 345/633 |
| 2012/0113235 A1 | 5/2012 | Shintani |
| 2012/0154557 A1 | 6/2012 | Perez et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0307075 A1 | 12/2012 | Margalitq |
| 2012/0314959 A1 | 12/2012 | White et al. |
| 2012/0326948 A1 | 12/2012 | Crocco et al. |
| 2013/0050833 A1 | 2/2013 | Lewis et al. |
| 2013/0077170 A1 | 3/2013 | Ukuda |
| 2013/0094148 A1 | 4/2013 | Sloane |
| 2013/0169923 A1 | 7/2013 | Schnoll et al. |
| 2013/0336138 A1 | 12/2013 | Venkatraman et al. |
| 2014/0016821 A1 | 1/2014 | Arth et al. |
| 2014/0022819 A1 | 1/2014 | Oh et al. |
| 2014/0119598 A1 | 5/2014 | Ramachandran et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0267419 A1 | 9/2014 | Ballard et al. |
| 2014/0274391 A1 | 9/2014 | Stafford |
| 2015/0005785 A1 | 1/2015 | Olson |
| 2015/0009099 A1 | 1/2015 | Queen |
| 2015/0123966 A1 | 5/2015 | Newman |
| 2015/0130790 A1 | 5/2015 | Vazquez, II et al. |
| 2015/0134995 A1 | 5/2015 | Park et al. |
| 2015/0138248 A1 | 5/2015 | Schrader |

(56) References Cited

U.S. PATENT DOCUMENTS

| | | |
|---|---|---|
| 2015/0155939 A1 | 6/2015 | Oshima et al. |
| 2015/0205126 A1 | 7/2015 | Schowengerdt |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0338915 A1 | 11/2015 | Publicover et al. |
| 2015/0355481 A1 | 12/2015 | Hilkes et al. |
| 2016/0027215 A1 | 1/2016 | Burns et al. |
| 2016/0077338 A1 | 3/2016 | Robbins et al. |
| 2016/0085300 A1 | 3/2016 | Robbins et al. |
| 2016/0093099 A1 | 3/2016 | Bridges |
| 2016/0123745 A1 | 5/2016 | Cotier et al. |
| 2016/0155273 A1 | 6/2016 | Lyren et al. |
| 2016/0180596 A1 | 6/2016 | Gonzalez del Rosario |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0274733 A1* | 9/2016 | Hasegawa ............ G06F 3/0488 |
| 2016/0321551 A1 | 11/2016 | Priness et al. |
| 2016/0327798 A1 | 11/2016 | Xiao et al. |
| 2016/0357255 A1 | 12/2016 | Lindh et al. |
| 2016/0370510 A1 | 12/2016 | Thomas |
| 2017/0038607 A1 | 2/2017 | Camara |
| 2017/0061696 A1 | 3/2017 | Li et al. |
| 2017/0100664 A1 | 4/2017 | Osterhout et al. |
| 2017/0115487 A1 | 4/2017 | Travis |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0192239 A1 | 7/2017 | Nakamura et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0232345 A1 | 8/2017 | Rofougaran et al. |
| 2017/0235126 A1 | 8/2017 | DiDomenico |
| 2017/0235142 A1 | 8/2017 | Wall et al. |
| 2017/0235147 A1 | 8/2017 | Kamakura |
| 2017/0281054 A1 | 10/2017 | Stever et al. |
| 2017/0287376 A1* | 10/2017 | Bakar ............ G09G 3/20 |
| 2017/0293141 A1 | 10/2017 | Schowengerdt et al. |
| 2017/0312032 A1 | 11/2017 | Amanatullah et al. |
| 2017/0329137 A1 | 11/2017 | Tervo |
| 2017/0332098 A1 | 11/2017 | Rusanovskyy et al. |
| 2017/0357332 A1 | 12/2017 | Balan et al. |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0088185 A1 | 3/2018 | Woods et al. |
| 2018/0102981 A1 | 4/2018 | Kurtzman et al. |
| 2018/0136466 A1 | 5/2018 | Ko |
| 2018/0190017 A1 | 7/2018 | Mendez et al. |
| 2018/0250589 A1 | 9/2018 | Cossairt et al. |
| 2019/0005069 A1 | 1/2019 | Filgueiras de Arajuo et al. |
| 2019/0011691 A1 | 1/2019 | Peyman |
| 2019/0056591 A1 | 2/2019 | Tervo et al. |
| 2019/0101758 A1 | 4/2019 | Zhu et al. |
| 2019/0172216 A1 | 6/2019 | Ninan et al. |
| 2019/0243123 A1 | 8/2019 | Bohn |
| 2019/0347853 A1* | 11/2019 | Chen ............ G06T 15/503 |
| 2021/0033871 A1 | 2/2021 | Jacoby et al. |

FOREIGN PATENT DOCUMENTS

| | | |
|---|---|---|
| EP | 1938141 A1 | 7/2008 |
| EP | 1943556 A2 | 7/2008 |
| EP | 3236211 A1 | 10/2017 |
| EP | 2723240 B1 | 8/2018 |
| JP | 2003-029198 A | 1/2003 |
| JP | 2007-012530 A | 1/2007 |
| JP | 2009-244869 A | 10/2009 |
| JP | 2012-015774 A | 1/2012 |
| JP | 6232763 B2 | 11/2017 |
| WO | 2002/071315 A2 | 9/2002 |
| WO | 2006132614 A1 | 12/2006 |
| WO | 2007/085682 A1 | 8/2007 |
| WO | 2007/102144 A1 | 9/2007 |
| WO | 2008148927 A1 | 12/2008 |
| WO | 2009/101238 A1 | 8/2009 |
| WO | 2013/049012 A1 | 4/2013 |
| WO | 2016/054092 A1 | 4/2016 |
| WO | 2017004695 A1 | 1/2017 |
| WO | 2018/044537 A1 | 3/2018 |
| WO | 2018087408 A1 | 5/2018 |
| WO | 2018166921 A1 | 9/2018 |
| WO | 2019148154 A1 | 8/2019 |
| WO | 2020010226 A1 | 1/2020 |

OTHER PUBLICATIONS

International Search Report and Written Opinion dated Oct. 16, 2019, International PCT Patent Application No. PCT/US19/36275, (10 pages).

"ARToolKit: Hardware", https://web.archive.org/web/20051013062315/http://www.hitl.washington.edu:80/artoolkit/documentation/hardware.htm, Oct. 13, 2015, (3 pages) (downloaded Oct. 26, 2020).

Azuma, Ronald T., "A Survey of Augmented Reality", Presence: Teleoperators and Virtual Environments 6, 4 (Aug. 1997), 355-385; https://web.archive.org/web/20010604100006/http://www.cs.unc.edu/-azuma/ARpresence.pdf (downloaded Oct. 26, 2020).

Azuma, Ronald T., "Predictive Tracking for Augmented Reality", Department of Computer Science, Chapel Hill NC; TR95-007, Feb. 1995, 262 pages.

Bimber, Oliver et al., "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).

Jacob, Robert J., "Eye Tracking in Advanced Interface Design", Human-Computer Interaction Lab, Naval Research Laboratory, Washington, D.C., date unknown. 2003, pp. 1-50.

Tanriverdi, Vildan et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.

Communication Pursuant to Article 94(3) EPC dated Sep. 4, 2019, European Patent Application 10793707.0, (4 pages).

Examination Report dated Jun. 19, 2020, European Patent Application No. 20154750.2, (10 pages).

Extended European Search Report dated May 20, 2020, European Patent Application No. 20154070.5, (7 pages).

Extended European Search Report dated Jun. 12, 2017, European Patent Application No. 16207441.3, (8 pages).

Final Office Action dated Aug. 10, 2020, U.S. Appl. No. 16/225,961, (13 pages).

Final Office Action dated Dec. 4, 2019, U.S. Appl. No. 15/564,517, (15 pages).

Final Office Action dated Feb. 19, 2020, U.S. Appl. No. 15/552,897, (17 pages).

International Search Report and Written Opinion dated Mar. 12, 2020, International PCT Patent Application No. PCT/US19/67919, (14 pages).

International Search Report and Written Opinion dated Aug. 15, 2019, International PCT Patent Application No. PCT/US19/33987, (20 pages).

International Search Report and Written Opinion dated Jun. 15, 2020, International PCT Patent Application No. PCT/US2020/017023, (13 pages).

International Search Report and Written Opinion dated Oct. 16, 2019, International PCT Patent Application No. PCT/US19/43097, (10 pages).

International Search Report and Written Opinion dated Oct. 16, 2019, International PCT Patent Application No. PCT/US19/43099, (9 pages).

(56) References Cited

OTHER PUBLICATIONS

International Search Report and Written Opinion dated Jun. 17, 2016, International PCT Patent Application No. PCT/FI2016/050172, (9 pages).
International Search Report and Written Opinion dated Oct. 22, 2019, International PCT Patent Application No. PCT/US19/43751, (9 pages).
International Search Report and Written Opinion dated Dec. 23, 2019, International PCT Patent Application No. PCT/US19/44953, (11 pages).
International Search Report and Written Opinion dated May 23, 2019, International PCT Patent Application No. PCT/US18/66514, (17 pages).
International Search Report and Written Opinion dated Sep. 26, 2019, International PCT Patent Application No. PCT/US19/40544, (12 pages).
International Search Report and Written Opinion dated Aug. 27, 2019, International PCT Application No. PCT/US2019/035245, (8 pages).
International Search Report and Written Opinion dated Dec. 27, 2019, International Application No. PCT/US19/47746, (16 pages).
International Search Report and Written Opinion dated Sep. 30, 2019, International Patent Application No. PCT/US19/40324, (7 pages).
International Search Report and Written Opinion dated Sep. 4, 2020, International Patent Application No. PCT/US20/31036, (13 pages).
International Search Report and Written Opinion dated Jun. 5, 2020, International Patent Application No. PCT/US20/19871, (9 pages).
International Search Report and Written Opinion dated Aug. 8, 2019, International PCT Patent Application No. PCT/US2019/034763, (8 pages).
International Search Report and Written Opinion dated Oct. 8, 2019, International PCT Patent Application No. PCT/US19/41151, (7 pages).
International Search Report and Written Opinion dated Jan. 9, 2020, International Application No. PCT/US19/55185, (10 pages).
International Search Report and Written Opinion dated Feb. 28, 2019, International Patent Application No. PCT/US18/64686, (8 pages).
International Search Report and Written Opinion dated Feb. 7, 2020, International PCT Patent Application No. PCT/US2019/061265, (11 pages).
International Search Report and Written Opinion dated Jun. 11, 2019, International PCT Application No. PCT/US19/22620, (7 pages).
Invitation to Pay Additional Fees dated Oct. 22, 2019, International PCT Patent Application No. PCT/US19/47746, (2 pages).
Invitation to Pay Additional Fees dated Apr. 3, 2020, International Patent Application No. PCT/US20/17023, (2 pages).
Invitation to Pay Additional Fees dated Oct. 17, 2019, International PCT Patent Application No. PCT/US19/44953, (2 pages).
Non Final Office Action dated Aug. 21, 2019, U.S. Appl. No. 15/564,517, (14 pages).
Non Final Office Action dated Jun. 17, 2020, U.S. Appl. No. 16/682,911, (22 pages).
Non Final Office Action dated Jun. 19, 2020, U.S. Appl. No. 16/225,961, (35 pages).
Non Final Office Action dated Nov. 19, 2019, U.S. Appl. No. 16/355,611, (31 pages).
Non Final Office Action dated Oct. 22, 2019, U.S. Appl. No. 15/859,277, (15 pages).
Non Final Office Action dated Sep. 1, 2020, U.S. Appl. No. 16/214,575, (40 pages).
Notice of Allowance dated Mar. 25, 2020, U.S. Appl. No. 15/564,517, (11 pages).
Summons to attend oral proceedings pursuant to Rule 115(1) EPC mailed on Jul. 15, 2019, European Patent Application No. 15162521.7, (7 pages).
Aarik, J. et al., "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document, (2 pages).
AZOM, , "Silica—Silicon Dioxide (SiO2)", AZO Materials; Publication [Online]. Dec. 13, 2001 [retrieved Feb. 19, 2020]. Retrieved from the Internet: <URL: https://www.azom.com/article.aspx?Article1D=1114>, (6 pages).
Goodfellow, "Titanium Dioxide—Titania (TiO2)", AZO Materials; Publication [online]. Jan. 11, 2002 [retrieved Feb. 19, 2020]. Retrieved from the Internet: <URL: https://www.azom.com/article.aspx?Article1D=1179>, (9 pages).
Levola, T. , "Diffractive Optics for Virtual Reality Displays", Journal of the SID EURODISPLAY 14/05, 2005, XP008093627, chapters 2-3, Figures 2 and 10, pp. 467-475.
Levola, Tapani , "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.
Memon, F. et al., "Synthesis, Characterization and Optical Constants of Silicon Oxycarbide", EPJ Web of Conferences; Publication [online]. Mar. 23, 2017 [retrieved Feb. 19, 2020).<URL: https://www.epj-conferences.org/articles/epjconf/pdf/2017/08/epjconf_nanop2017_00002.pdf>; DOI: 10.1051/epjconf/201713900002, (8 pages).
Spencer, T. et al., "Decomposition of poly(propylene carbonate) with UV sensitive iodonium 11 salts", Polymer Degradation and Stability; (online]. Dec. 24, 2010 (retrieved Feb. 19, 2020]., <URL: http://fkohl.chbe.gatech.edu/sites/default/files/linked_files/publications/2011Decomposition%20of20poly(propylene%20carbonate)%20with%20UV%20sensitive%20iodonium%20salts,pdf>; DOI: 10, 1016/j.polymdegradstab.2010, 12.003, (17 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>, p. 238-246.
Final Office Action dated Mar. 19, 2021, U.S. Appl. No. 16/530,776, (25 pages).
International Search Report and Written Opinion dated Feb. 12, 2021, International Application No. PCT/US20/60555, (25 pages).
Non Final Office Action dated Mar. 3, 2021, U.S. Appl. No. 16/427,337, (41 pages).
European Search Report dated Oct. 15, 2020, European Patent Application No. 20180623.9, (10 pages).
Extended European Search Report dated Jan. 22, 2021, European Patent Application No. 18890390.0, (11 pages).
Extended European Search Report dated Nov. 3, 2020, European Patent Application No. 18885707.2, (7 pages).
Extended European Search Report dated Nov. 4, 2020, European Patent Application No. 20190980.1, (14 pages).
International Search Report and Written Opinion dated Feb. 2, 2021, International PCT Patent Application No. PCT/US20/60550, (9 pages).
International Search Report and Written Opinion dated Dec. 3, 2020, International Patent Application No. PCT/US20/43596, (25 pages).
Non Final Office Action dated Jan. 26, 2021, U.S. Appl. No. 16/928,313, (33 pages).
Non Final Office Action dated Jan. 27, 2021, U.S. Appl. No. 16/225,961, (15 pages).
Non Final Office Action dated Nov. 5, 2020, U.S. Appl. No. 16/530,776, (45 pages).
"Phototourism Challenge", CVPR 2019 Image Matching Workshop. https://image matching-workshop. github.io., (16 pages).
Altwaijry, et al., "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] < URL: http://www.bmva.org/bmvc/2016/papers/paper049/index.html >, en lire document, especially Abstract, pp. 1-6 and 9.

(56) References Cited

OTHER PUBLICATIONS

Arandjelović, Relja et al., "Three things everyone should know to improve object retrieval", CVPR, 2012, (8 pages).
Battaglia, Peter W. et al., "Relational inductive biases, deep learning, and graph networks", arXiv:1806.01261, Oct. 17, 2018, pp. 1-40.
Berg, Alexander C et al., "Shape matching and object recognition using low distortion correspondences", In CVPR, 2005, (8 pages).
Bian, Jiawang et al., "GMS: Grid-based motion statistics for fast, ultra-robust feature correspondence.", In CVPR (Conference on Computer Vision and Pattern Recognition), 2017, (10 pages).
Brachmann, Eric et al., "Neural-Guided RANSAC: Learning Where to Sample Model Hypotheses", In ICCV (International Conference on Computer Vision ), arXiv:1905.04132v2 [cs.CV] Jul. 31, 2019, (17 pages).
Butail, et al., "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document, (8 pages).
Caetano, Tibério S et al., "Learning graph matching", IEEE TPAMI, 31(6):1048-1058, 2009.
Cech, Jan et al., "Efficient sequential correspondence selection by cosegmentation", IEEE TPAMI, 32(9):1568-1581, Sep. 2010.
Cuturi, Marco , "Sinkhorn distances: Lightspeed computation of optimal transport", NIPS, 2013, (9 pages).
Dai, Angela et al., "ScanNet: Richly-annotated 3d reconstructions of indoor scenes", In CVPR, arXiv:1702.04405v2 [cs.CV] Apr. 11, 2017, (22 pages).
Deng, Haowen et al., "PPFnet: Global context aware local features for robust 3d point matching", In CVPR, arXiv:1802.02669v2 [cs.CV] Mar. 1, 2018, (12 pages).
Detone, Daniel et al., "Deep image homography estimation", In RSS Work-shop: Limits and Potentials of Deep Learning in Robotics, arXiv:1606.03798v1 [cs.CV] Jun. 13, 2016, (6 pages).
Detone, Daniel et al., "Self-improving visual odometry", arXiv:1812.03245, Dec. 8, 2018, (9 pages).
Detone, Daniel et al., "SuperPoint: Self-supervised interest point detection and description", In CVPR Workshop on Deep Learning for Visual SLAM, arXiv:1712.07629v4 [cs.CV] Apr. 19, 2018, (13 pages).
Dusmanu, Mihai et al., "D2-net: A trainable CNN for joint detection and description of local features", CVPR, arXiv:1905.03561v1 [cs.CV] 9 May 2019, (16 pages).
Ebel, Patrick et al., "Beyond cartesian representations for local descriptors", ICCV, arXiv:1908.05547v1 [cs.CV] Aug. 15, 2019, (11 pages).
Fischler, Martin A et al., "Random sample consensus: a paradigm for model fitting with applications to image analysis and automated cartography", Communications of the ACM, 24(6): 1981, pp. 381-395.
Gilmer, Justin et al., "Neural message passing for quantum chemistry", In ICML, arXiv:1704.01212v2 [cs.LG] Jun. 12, 2017, (14 pages).
Hartley, Richard et al., "Multiple View Geometry in Computer Vision", Cambridge University Press, 2003, pp. 1-673.
Lee, et al., "Self-Attention Graph Pooling", Cornell University Library/Computer Science/ Machine Learning, Apr. 17, 2019 [retrieved on Jan. 8, 2021 from the Internet< URL: https://arxiv.org/abs/1904.08082 >, entire document.
Lee, Juho et al., "Set transformer: A frame-work for attention-based permutation-invariant neural networks", ICML, arXiv:1810.00825v3 [cs.LG] May 26, 2019, (17 pages).
Leordeanu, Marius et al., "A spectral technique for correspondence problems using pairwise constraints", Proceedings of (ICCV) International Conference on Computer Vision, vol. 2, pp. 1482-1489, Oct. 2005, (8 pages).
Li, Yujia et al., "Graph matching networks for learning the similarity of graph structured objects", ICML, arXiv:1904.12787v2 [cs.LG] May 12, 2019, (18 pages).
Li, Zhengqi et al., "Megadepth: Learning single-view depth prediction from internet photos", In CVPR, fromarXiv: 1804.00607v4 [cs.CV] Nov. 28, 2018, (10 pages).
Libovicky, et al., "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document, pp. 253-260.
Loiola, Eliane M. et al., "A survey for the quadratic assignment problem", European journal of operational research, 176(2): 2007, pp. 657-690.
Lowe, David G. , "Distinctive image features from scale-invariant keypoints", International Journal of Computer Vision, 60(2): 91-110, 2004, (28 pages).
Luo, Zixin et al., "ContextDesc: Local descriptor augmentation with cross-modality context", CVPR, arXiv:1904.04084v1 [cs.CV] Apr. 8, 2019, (14 pages).
Munkres, James , "Algorithms for the assignment and transportation problems", Journal of the Society for Industrial and Applied Mathematics, 5(1): 1957, pp. 32-38.
Ono, Yuki et al., "LF-Net: Learning local features from images", 32nd Conference on Neural Information Processing Systems (NIPS 2018), arXiv:1805.09662v2 [cs.CV] Nov. 22, 2018, (13 pages).
Paszke, Adam et al., "Automatic differentiation in Pytorch", 31st Conference on Neural Information Processing Systems (NIPS 2017), Long Beach, CA, USA, (4 pages).
Peyré, Gabriel et al., "Computational Optimal Transport", Foundations and Trends in Machine Learning, 11(5-6):355-607, 2019; arXiv:1803.00567v4 [stat.ML] Mar. 18, 2020, (209 pages).
Qi, Charles R. et al., "Pointnet++: Deep hierarchical feature learning on point sets in a metric space.", 31st Conference on Neural Information Processing Systems (NIPS 2017), Long Beach, CA, USA., (10 pages).
Qi, Charles R et al., "Pointnet: Deep Learning on Point Sets for 3D Classification and Segmentation", CVPR, arXiv:1612.00593v2 [cs.CV] Apr. 10, 201, (19 pages).
Radenović, Filip et al., "Revisiting Oxford and Paris: Large-Scale Image Retrieval Benchmarking", CVPR, arXiv:1803.11285v1 [cs.CV] Mar. 29, 2018, (10 pages).
Raguram, Rahul et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René et al., "Deep fundamental matrix estimation", European Conference on Computer Vision (ECCV), 2018, (17 pages).
Revaud, Jerome et al., "R2D2: Repeatable and Reliable Detector and Descriptor", In NeurIPS, arXiv:1906.06195v2 [cs.CV] Jun. 17, 2019, (12 pages).
Rocco, Ignacio et al., "Neighbourhood Consensus Networks", 32nd Conference on Neural Information Processing Systems (NeurIPS 2018), Montréal, Canada, arXiv:1810.10510v2 [cs.CV] Nov. 29, 2018, (20 pages).
Rublee, Ethan et al., "ORB: An efficient alternative to SIFT or SURF", Proceedings of the IEEE International Conference on Computer Vision. 2564-2571. 2011; 10.1109/ICCV.2011.612654, (9 pages.).
Sarlin, et al., "SuperGlue: Learning Feature Matching with Graph Neural Networks", Cornell University Library/Computer Science/ Computer Vision and Pattern Recognition, Nov. 26, 2019 [retrieved on Jan. 8, 2021 from the Internet< URL: https://arxiv.org/abs/1911.11763 >, entire document, especially.
Sattler, Torsten et al., "SCRAMSAC: Improving RANSAC's efficiency with a spatial consistency filter", ICCV, 2009: 2090-2097., (8 pages).
Schonberger, Johannes L. et al., "Pixelwise view selection for unstructured multi-view stereo", Computer Vision—ECCV 2016: 14th European Conference, Amsterdam, The Netherlands, Oct. 11-14, 2016, Proceedings, Part III, pp. 501-518, 2016.
Schonberger, Johannes L. et al., "Structure-from-motion revisited", Proceedings of the IEEE Conference on Computer Vision and Pattern Recognition (CVPR), 2016, pp. 4104-4113, (11 pages).

(56) References Cited

OTHER PUBLICATIONS

Sinkhorn, Richard et al., "Concerning nonnegative matrices and doubly stochastic matrices.", Pacific Journal of Mathematics, 1967, pp. 343-348.
Thomee, Bart et al., "YFCC100m: The new data in multimedia research", Communications of the ACM, 59(2):64-73, 2016; arXiv:1503.01817v2 [cs.MM] Apr. 25, 2016, (8 pages).
Torresani, Lorenzo et al., "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne et al., "Wide baseline stereo matching based on local, affinely invariant regions", BMVC, 2000, pp. 1-14.
Ulyanov, Dmitry et al., "Instance normalization: The missing ingredient for fast stylization", arXiv:1607.08022v3 [cs.CV] Nov. 6, 2017, (6 pages).
Vaswani, Ashish et al., "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar et al., "Graph attention networks", ICLR, arXiv:1710.10903v3 [stat.ML] Feb. 4, 2018, (12 pages).
Villani, Cédric , "Optimal transport: old and new", vol. 338. Springer Science & Business Media, Jun. 2008, pp. 1-998.
Wang, Xiaolong et al., "Non-local neural networks", CVPR, arXiv:1711.07971v3 [cs.CV] Apr. 13, 2018, (10 pages).
Wang, Yue et al., "Deep Closest Point: Learning representations for point cloud registration", ICCV, arXiv:1905.03304v1 [cs.CV] May 8, 2019, (10 pages).
Wang, Yue et al., "Dynamic Graph CNN for learning on point clouds", ACM Transactions on Graphics, arXiv:1801.07829v2 [cs.CV] Jun. 11, 2019, (13 pages).
Yi, Kwang M. et al., "Learning to find good correspondences", CVPR, arXiv:1711.05971v2 [cs.CV] May 21, 2018, (13 pages).
Yi, Kwang Moo et al., "Lift: Learned invariant feature transform", ECCV, arXiv:1603.09114v2 [cs.CV] Jul. 29, 2016, (16 pages).
Zaheer, Manzil et al., "Deep Sets", 31st Conference on Neural Information Processing Systems (NIPS 2017), Long Beach, CA, USA; arXiv:1703.06114v3 [cs.LG] Apr. 14, 2018, (29 pages).
Zhang, Jiahui et al., "Learning two-view correspondences and geometry using order-aware network", ICCV; aarXiv:1908.04964v1. [cs.CV] Aug. 14, 2019, (11 pages).
Zhang, Li et al., "Dual graph convolutional net-work for semantic segmentation", BMVC, 2019; arXiv:1909.06121v3 [cs.CV] Aug. 26, 2020, (18 pages).
Invitation to Pay Additional Fees dated Sep. 24, 2020, International Patent Application No. PCT/US2020/043596, (3 pages).
Notice of Allowance dated Oct. 5, 2020, U.S. Appl. No. 16/682,911, (27 pages).
Notice of Reason of Refusal dated Sep. 11, 2020 with English translation, Japanese Patent Application No. 2019-140435, (6 pages).

\* cited by examiner

AUGMENTED REALITY VIEWER WITH AUTOMATED SURFACE SELECTION PLACEMENT AND CONTENT ORIENTATION PLACEMENT

CROSS-REFERENCE TO RELATED APPLICATIONS

This application claims priority from U.S. Provisional Patent Application No. 62/682,788, filed on Jun. 8, 2018, all of which is incorporated herein by reference in its entirety.

BACKGROUND OF THE INVENTION

1). Field of the Invention

This invention relates to an augmented reality viewer and to an augmented reality viewing method.

2). Discussion of Related Art

Modern computing and display technologies have facilitated development of "augmented reality" viewers. An augment reality viewer is a wearable device that presents the user with two images, one for the left eye and one for the right eye. Objects in the images for each eye are rendered with slightly different viewpoints that allows the brain to process the objects as three-dimensional objects. When the images constantly change viewpoints as the viewer moves, movement around synthetic three-dimensional content can be simulated.

An augmented reality viewer usually includes technology that allows the presentation of digital or virtual image information as an augmentation to visualization of the actual world around the user. In one implementation, the virtual image information is presented in a static location relative to the augmented reality viewer so that, if the user moves their head, and the augmented reality viewer with their head, the user is presented with an image that remains in a stationary position in front of them while real world objects shift in their view. This gives the user the appearance that the virtual image information is not fixed relative to the real world objects, but instead is fixed in the viewer's point of view. In other implementations, technologies exist to keep the virtual image information in a stationary position relative to the real world objects when the user moves their head. In the latter scenario, the user may be given some control over the initial placement of the virtual image information relative to the real world objects.

SUMMARY OF THE INVENTION

The invention provides an augmented reality viewer including, a display that permits a user to see real world objects, a data channel to hold content, a user orientation determination module to determine a first user orientation of a user relative to a first display area and to determine a second user orientation of the user relative to the first display area, a projector connected to the data channel to display the content through the display to the user within confines of the first display area while the user views the real world objects and a content orientation selection module connected to the surface extraction module and the user orientation module to display the content in a first content orientation relative to the first display area so that a near edge of the content is close to the user when the user is in the first user orientation, and display the content in a second content orientation relative to the first display area so that the near edge is rotated closer to the user when the user is in the second user orientation and the content is rotated relative to the first display area from the first content orientation to the second content orientation.

The invention further provides an augmented reality viewing method comprising determining, by the processor, a first user orientation of a user relative to a first display area, determining, by the processor, a first content orientation relative to the display when the user is in the first orientation, displaying, by the processor, content in the first content orientation through a display to the user within confines of the first display area while the user views real world objects through the display while in the first user orientation, determining, by the processor, a second user orientation of the user relative to the first display area, determining, by the processor, a second content orientation relative to the display when the user is in the second location and displaying, by the processor, content in the second content orientation through a display to the user within confines of the display area while the user views real world objects through the display from the second location, wherein the content is rotated relative to the first display area from the first content orientation to the second content orientation.

The invention also provides an augmented reality viewer including a display that permits a user to see real world objects, a data channel to hold content, a surface area extraction module to determine a first surface area and a second surface area, a user orientation determination module to determine a first orientation of a user relative to the first surface area and the second surface area, a surface area selection module to select a preferred surface area between the first surface area and the second surface area based on normal to the respective surface area being directed more opposite to the first user orientation of the user and a projector that displays the content through the display to the user within confines of the preferred surface area while the user views the real world objects.

The invention further provides an augmented reality viewing method including determining, by a processor, a first surface area and a second surface area, determining, by the processor, a first orientation of a user relative to the first surface area and the second surface area, selecting, by the processor, a preferred surface area between the first surface area of the second surface area based on normal to the respective surface area being directed more towards the first location of the user and displaying, by the processor, content through a display to the user within confines of the preferred surface area while the user views real world objects through the display from the first location.

The invention also provides an augmented reality viewer including an environmental calculation unit to determine a first vector indicative an orientation of a user, a vector calculator to a calculate a second vector, a selection module to calculate a dot product of the first vector and the second vector, a data channel to hold content, a content rendering module to determine placement of the content based on the dot product, a display that permits the user to see real world objects and a projector that displays the content through the display to the user while the user views the real world objects through the display, the content being displayed based on the placement determined by the content rendering module.

The invention further provides an augmented reality viewing method including determining, by a processor, a first vector indicative an orientation of a user, calculating, by the processor, a second vector, calculating, by the processor, a dot product of the first vector and the second vector, determining, by the processor, placement of content based on the dot product and displaying, by the processor, the content through a display to the user while the user views real world objects through the display, the content being displayed based on the placement determined by the content rendering module.

BRIEF DESCRIPTION OF THE DRAWINGS

The invention is further described by way of example with reference to the accompanying drawings, wherein.

DETAILED DESCRIPTION OF THE INVENTION

The terms "surface" and "surface area" are used herein to describe two-dimensional areas that are suitable for use as display areas. Aspects of the invention may find application when other display areas are used, for example a display area that is a three-dimensional surface area or a display area representing a slice within a three-dimensional volume.

Figure 1A:
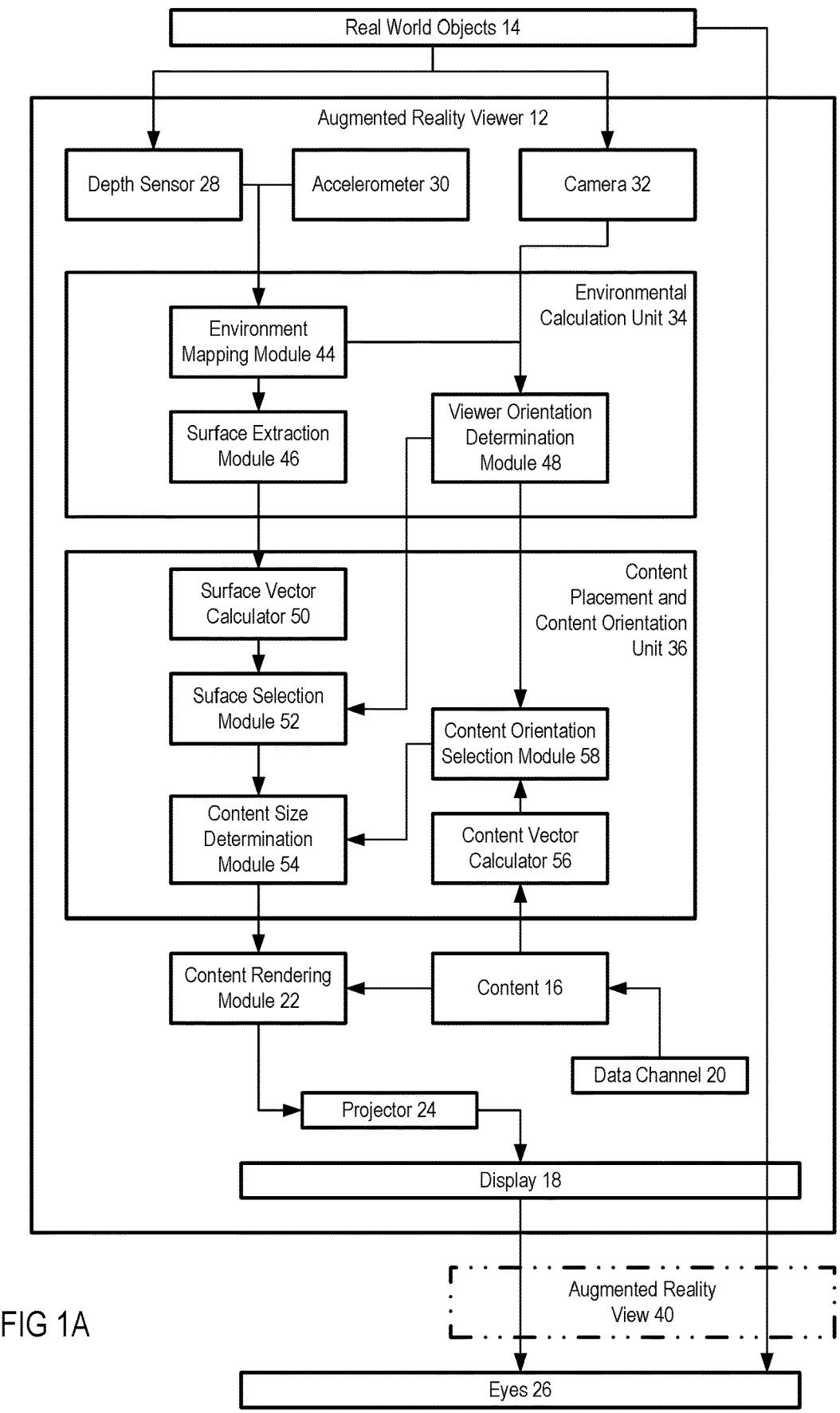
FIG. 1A is a block diagram of an augmented reality viewer that is used by a user to see real world objects augmented with content from a computer.

FIG. 1A of the accompanying drawings illustrates an augmented reality viewer 12 that a user uses to see a direct view of a real world scene, including real world surfaces and real world objects 14, that is augmented with content 16 of the kind that is stored on, received by, or otherwise generated by a computer or computer network.

The augmented reality viewer 12 includes a display 18, a data channel 20, a content rendering module 22, a projector 24, a depth sensor 28, a position sensor such as an accelerometer 30, a camera 32, an environmental calculation unit 34, and a content placement and content orientation unit 36.

The data channel 20 may be connected to a storage device that holds the content 16 or may be connected to a service that provides the content 16 in real time. The content 16 may for example be static images such as photographs, images that remain static for a period of time and can be manipulated by a user such as web pages, text documents or other data that is displayed on a computer display, or moving images such as videos or animations. The content 16 may be two-dimensional, three-dimensional, static, dynamic, text, image, video, etc. The content 16 may include games, books, movies, video clips, advertisements, avatars, drawings, applications, web pages, decorations, sports games, replays, 3-D models or any other type of content as will be appreciated by one of skill in the art.

The content rendering module 22 is connected to the data channel 20 to receive the content 16 from the data channel 20. The content rendering module 22 converts the content 16 into a form that is suitable for three-dimensional viewing. Various techniques exist for viewing two-dimensional planes in three-dimensional space depending on the orientation of the user, or viewing three-dimensional volumes in three dimensions by the user.

The projector 24 is connected to the content rendering module 22. The projector 24 converts data generated by the content rendering module 22 into light and delivers the light to the display 18. The light travels from the display 18 to eyes 26 of the user. Various techniques exist for providing the user with a three-dimensional experience. Each eye is provided with a different image and objects in the images are perceived by the user as being constructed in three dimensions. Techniques also exist for the user to focus on the objects at a field of depth that is not necessarily in the plane of the display 18 and is typically at some distance behind the display 18. One way that virtual content can be made to appear to be at a certain depth is by causing light rays to diverge and form a curved wavefront in a way that mimics how light from real physical objects reaches an eye. The eye then focuses the diverging light beams onto the retina by changing shape of the anatomic lens in a process called accommodation. Different divergence angles represent different depths and are created using diffraction gratings on the exit pupil expander on the waveguides.

The display 18 is a transparent display. The display 18 allows the user to see the real world objects 14 through the display 18. The user thus perceives an augmented reality view 40 wherein the real world objects 14 that the user sees in three-dimensions are augmented with a three-dimensional image that is provide to the user from the projector 24 via the display 18.

The depth sensor 28 and the camera 32 are mounted in a position to capture the real world objects 14. The depth sensor 28 typically detects electromagnetic waves in the infrared range and the camera 32 detects electromagnetic waves in the visible light spectrum. As more clearly shown in FIG. 1B, more than one camera 32 may be mounted on a frame 13 of the augmented reality viewer 12 in a world-facing position. In the particular embodiment, four cameras 32 are mounted to the frame 13 with two in a forward world-facing position and two in a left and right side or oblique world-facing position. The fields of view of the multiple cameras 32 may overlap. The depth sensor 28 and the cameras 32 are mounted in a static position relative to a frame 13 of the augmented reality viewer 12. Center points of images that are captured by the depth sensor 28 and the camera 32 are always in the same, forward direction relative to the augmented reality viewer 12.

The accelerometer 30 is mounted in a stationary position to the frame of the augmented reality viewer 12. The accelerometer 30 detects the direction of gravitation force. The accelerometer 30 can be used to determine the orientation of the augmented reality viewer with respect to the Earth's gravitational field. The combination of the depth sensor 28 and a head pose algorithm that relies on visual simultaneous localization and mapping ("SLAM") and inertial measurement unit ("IMU") input, accelerometer 30 permits the augmented reality viewer 12 to establish the locations of the real world objects 14 relative to the direction of gravitation force and relative to the augmented reality viewer 12.

The camera 32 captures images of the real world objects 14 and further processing of the images on a continual basis provides data that indicates movement of the augmented reality viewer 12 relative to the real world objects 14. Because the depth sensor 28, world cameras 32, and the accelerometer 30 determine the locations of the real world objects 14 relative to gravitation force on a continual basis, the movement of the augmented reality viewer 12 relative to gravitation force and a mapped real world environment can also be calculated.

In FIG. 1A, the environmental calculation unit 34 includes an environment mapping module 44, a surface extraction module 46 and a viewer orientation determination module 48. The environment mapping module 44 may receive input from one or more sensors. The one or more sensors may include, for example, the depth sensor 28, one or more world camera 32, and the accelerometer 30 to determine the locations of the real world surfaces and objects 14. The surface extraction module 46 is may receive data from the environment mapping module 44 and determines planar surfaces in the environment. The viewer orientation determination module 48 is connected to and receives input from the depth sensor 28, the cameras 32, and the accelerometer 30 to determine a user orientation of the user relative to the real world objects 14 and the surfaces that are identified by the surface extraction module 46.

The content placement and content orientation unit 36 includes a surface vector calculator 50, a surface selection module 52, a content size determination module 54, a content vector calculator 56 and a content orientation selection module 58. The surface vector calculator 50, the surface selection module 52 and content size determination module 54 may be sequentially connected to one another. The surface selection module 52 is connected to and provides input to the viewer orientation determination module 48. The content vector calculator 56 is connected to the data channel 20 so as to be able to receive the content 16. The content orientation selection module 58 connected to and receives input from the content vector calculator 56 and the viewer orientation determination module 48. The content size determination module 54 is connected and provides input to the content orientation selection module 58. The content rendering module 22 is connected and receives input from the content size determination module 54.

Figure 2:
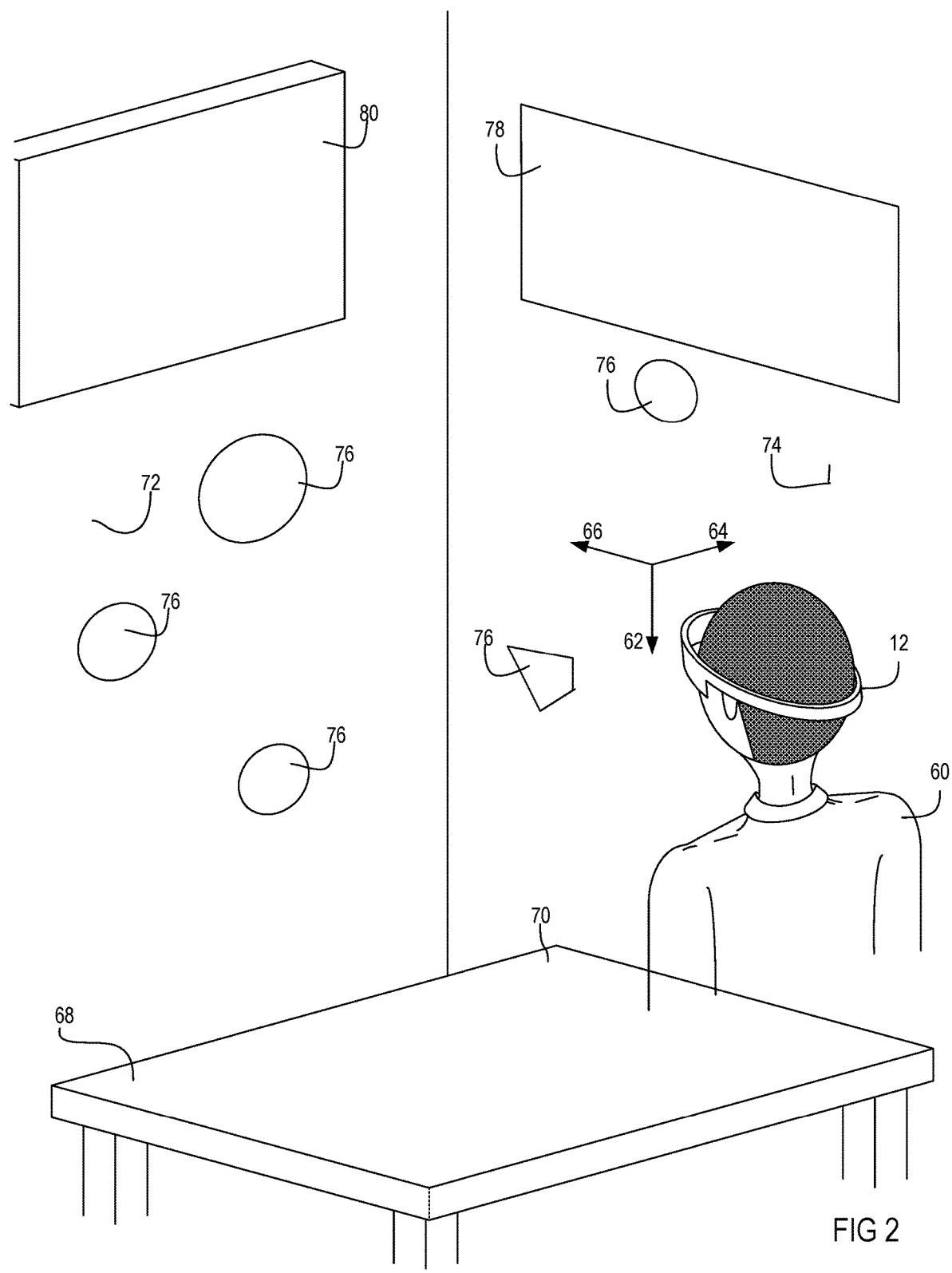
FIG. 2 is a perspective view illustrating a user wearing the augmented reality viewer in a three-dimensional environment while viewing two-dimensional content.

FIG. 2 illustrates a user 60 who is wearing the augmented reality viewer 12 within a three-dimensional environment.

Figure 1B:
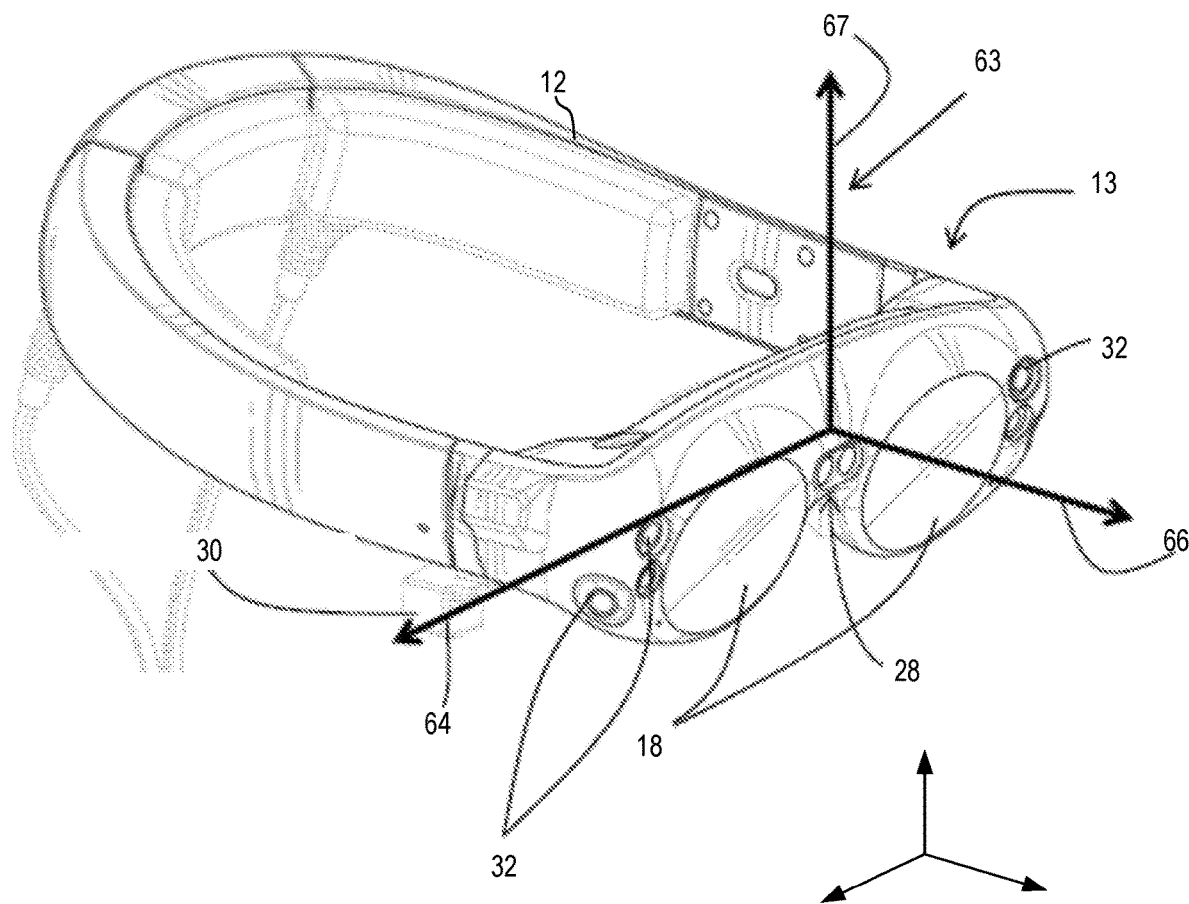
FIG. 1B is a perspective view of the augmented reality viewer.

A vector 62 signifies a direction of gravitation force as detected by one or more sensors on the augmented reality viewer 12. A vector 64 signifies a direction to the right from a perspective of the user 60. A user orientation vector 66 signifies a user orientation, in the present example a forward direction in the middle of a view of the user 60. The user orientation vector 66 also points in a direction that is to the center points of the images captured by the depth sensor 28 and camera 32 in FIG. 1. FIG. 1B shows a further coordinate system 63 that includes the vector 64 to the right, the user orientation vector 66 and a device upright vector 67 that are orthogonal to one another.

The three-dimensional environment, by way of illustration, includes a table 68 with a horizontal surface 70, surfaces 72 and 74, objects 76 that provide obstructions that may make the surfaces 72 and 74 unsuitable for placement of content. For example, objects 76 that disrupt continuous surfaces 72 and 74 may include picture frames, mirrors, cracks in a wall, rough texture, a different colored area, a hole in the surface, a protrusion of the surface, or any other non-uniformity with respect to the planar surfaces 72, 74. In contrast, the surfaces 78 and 80 may be more suitable for placement of content because of their relatively large size and their proximity to the user 60. Depending on the type of content being displayed, it may also be advantageous to find a surface having rectangular dimensions, although other shapes such as squares, triangles, circles, ovals, or polygons may also be used.

Figure 3:
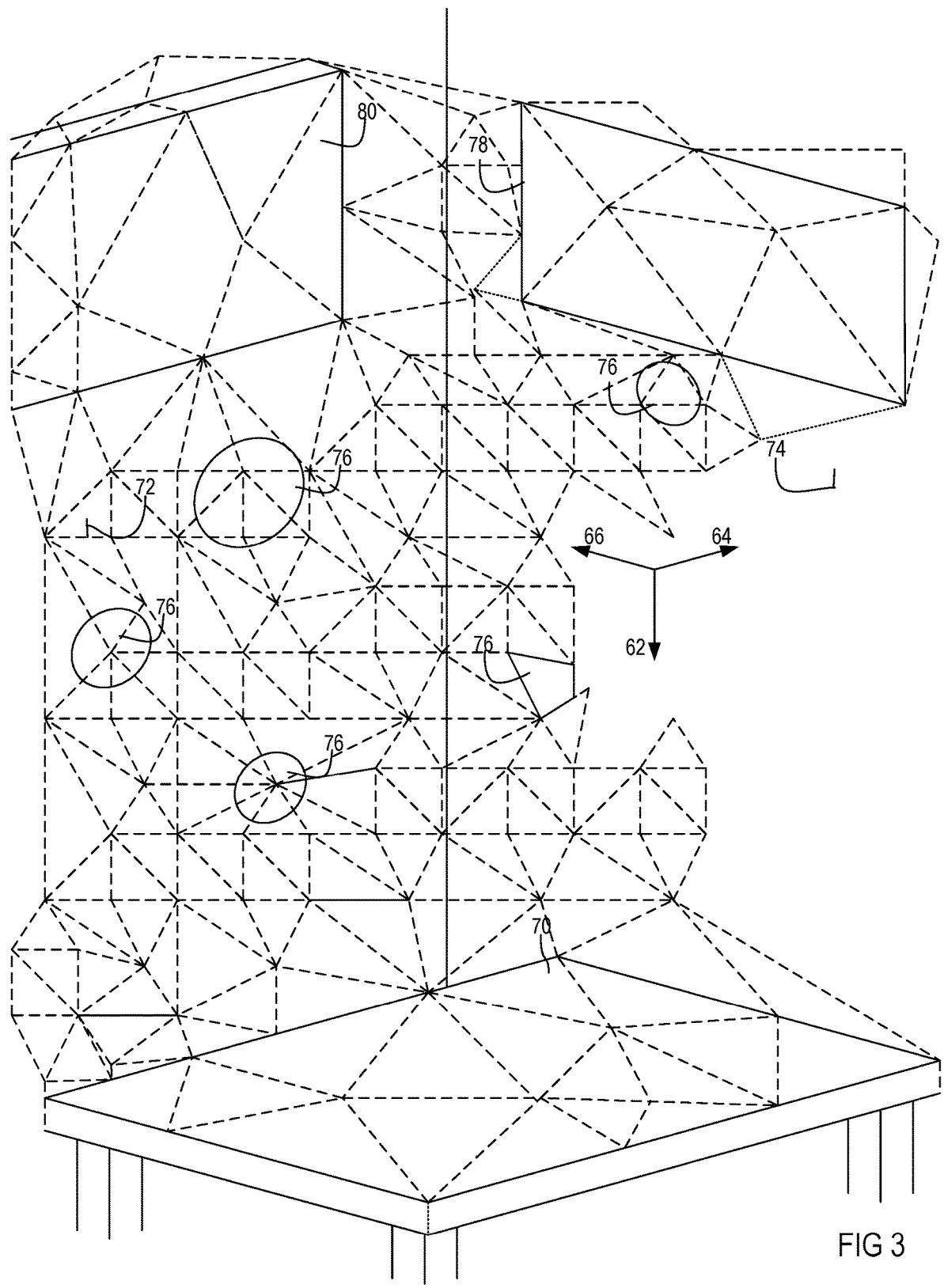
FIG. 3 is a perspective view illustrating a three-dimensional data map that is created with the augmented reality viewer.

FIG. 3 illustrates the functioning of the depth sensor 28, accelerometer 30 and environment mapping module 44 in FIG. 1. The depth sensor 28 captures the depth of all features, including objects and surfaces in the three-dimensional environment. The environment mapping module 44 receives data, directly or indirectly, from one or more sensors on the augmented reality viewer 12. For example, the depth sensor 28 and the accelerometer 30 may provide input to the environment mapping module 44 for mapping the depth of the three-dimensional environment in three dimensions.

FIG. 3 also illustrates the functioning of the camera 32 and the viewer orientation determination module 48. The camera 32 captures an image of the objects 76 and surfaces 78. The viewer orientation determination module 48 receives an image from the camera 32 and processes the image to determine that an orientation of the augmented reality viewer 12 that is worn by the user 60 is as represented by the user orientation vector 66.

Other methods of mapping a three-dimensional environment may be employed, for example using one or more cameras that are located in a stationary position within a room. However, the integration of the depth sensor 28 and the environment mapping module 44 within the augmented reality viewer 12 provides for a more mobile application.

Figure 4:
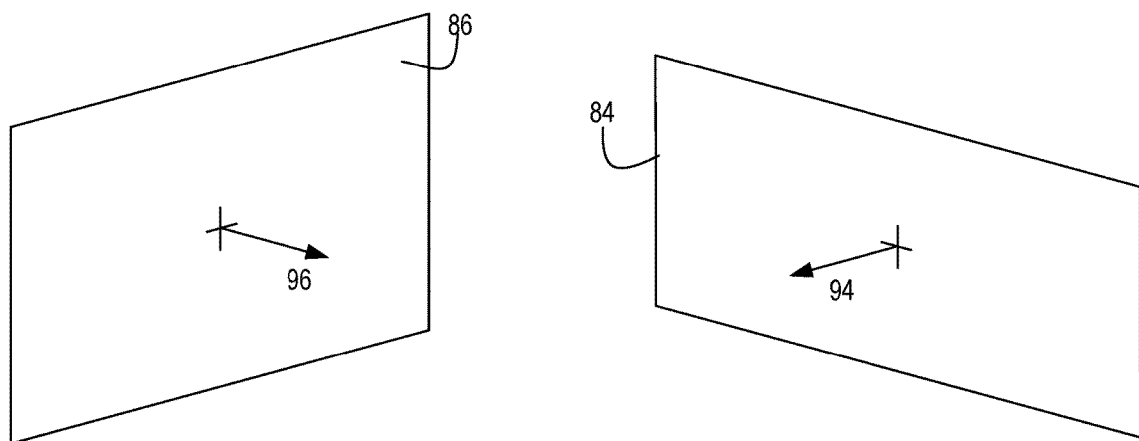
FIG. 4 is a perspective view illustrating the determination of a user orientation vector, the extraction of surface areas and the calculation of surface area orientation vectors.
Figure 4:
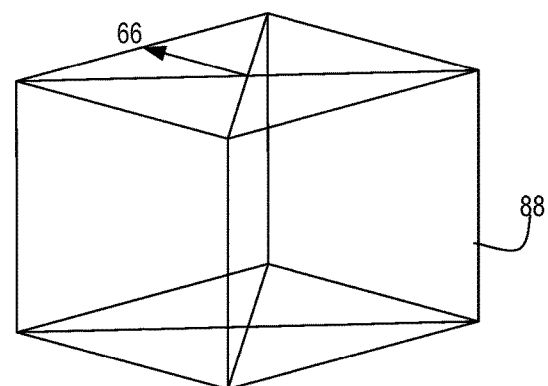
Figure 4:
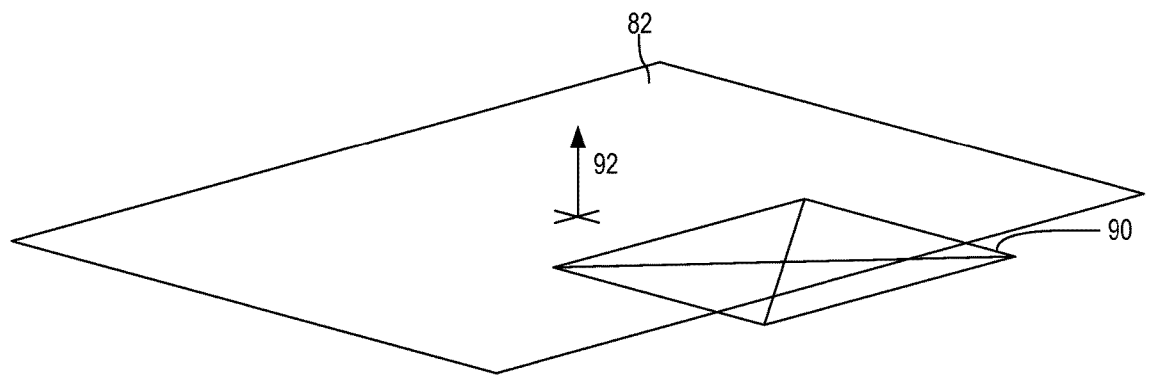

FIG. 4 illustrates the functioning of the surface extraction module 46 in FIG. 1. The surface extraction module 46 processes the three-dimensional map that is created in FIG. 3 to determine whether there are any surfaces that are suitable for placement and viewing of content, in the present example two-dimensional content. The surface extraction module 46 determines a horizontal surface area 82 and two vertical surface areas 84 and 86. The surface areas 82, 84 and 86 are not real surfaces, but instead electronically represent two-dimensional planar surfaces oriented in a three-dimensional environment. The surface areas 82, 84 and 86, which are data representations, correspond respectively to the real surfaces 70, 78 and 80 in FIG. 2 forming part of the real world objects 14 in FIG. 1.

FIG. 4 illustrates a cube 88 and a shadow 90 of the cube 88. These elements are used by the author to assist the viewer to track changes in the user orientation vector 66 and movement of the user 60 and the augmented reality viewer 12 in FIG. 2 through the three-dimensional space.

FIG. 4 also illustrates the functioning of the surface vector calculator 50 in FIG. 1. The surface vector calculator 50 calculates a surface area orientation vector for each extracted surface of the mapped three-dimensional environment. For example, the surface vector calculator 50 calculates a surface area orientation vector 92 that is normal to a plane of the surface area 82. Similarly, the surface vector calculator 50 calculates a surface area orientation vector 94 that is normal to the surface area 84 and a surface area orientation vector 94 that is normal to the surface area 86.

Selection of a surface on which to display virtual content is done by a surface selection module 52 that calculates a relationship between the surface and the user. The surface selection module 52 in FIG. 1A calculates a dot product of the user orientation vector 66 and the surface area orientation vector 92. The dot product of unit vectors a and b is represented by the following equation:

$$a \cdot b = |a||b|\cos \theta \quad [1]$$

where |a|=1
|b|=1
θ is the angle between unit vectors a and b.

The user orientation vector 66 and the surface area orientation vector 92 are orthogonal to one another, which means their dot product is zero.

The surface selection module 52 also calculates a dot product of the user orientation vector 66 and the surface area orientation vector 94. Because the user orientation vector 66 and the surface area orientation vector 94 are orthogonal their dot product is zero.

The surface selection module 52 also calculates a dot product of the user orientation vector 66 and the surface area orientation vector 96. Because the user orientation vector 66 and the surface area orientation vector 96 are 180° relative to one another, their dot product is −1. Because the dot product that includes the surface area orientation vector 96 is the most negative of the three dot products, the surface selection module 52 determines that the surface area 86 is the preferred surface area between the surface areas 82, 84 and 86 for displaying content. The more negative the dot product is, the more likely it will be that content will be oriented to be directly facing the viewer. Because the surface area 86 is a vertical surface area, the content placement and content orientation unit 36 does not invoke the content orientation selection module 58 in FIG. 1. The dot product is one of many surface characteristics that can be prioritized by the system or by the needs of the virtual content for choosing the best surface. For example, if the surface that has a dot product of −1.0 is tiny and is far away from the user, it may not be preferable over a surface that has a dot product of −0.8 but is large and near to the user. The system may choose a surface that has good contrast ratio properties when placing content, so it will be easier for the user to see. Next, the content size determination module 54 determines an appropriate size of content to display on the surface area 86. The content has an optimal aspect ratio, for example an aspect ratio of 16 on a near edge and 9 on a side edge. The content size determination module 54 uses the ratio of the near edge to the side edge to determine the size and shape of the content, preserving this aspect ratio at all viewing angles so as not to distort content. The content size determination module 54 calculates the optimal height and width of the content with the optimal aspect ratio that will fit with the surface area 86. In the given example, the distance between left and right edges of the surface area 86 determines the size of the content.

Figure 5:
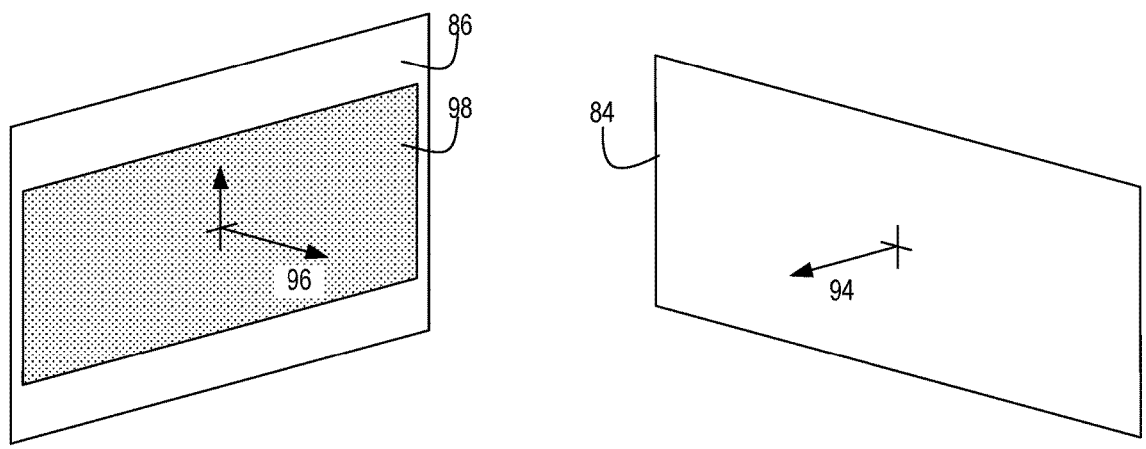
FIG. 5 is a view similar to FIG. 4 illustrating placement of a rendering of content on one of the surface areas.
Figure 5:
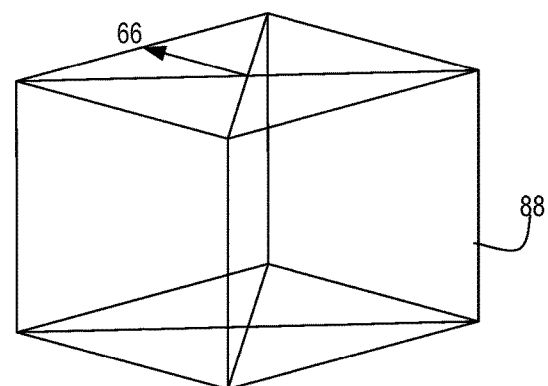
Figure 5:
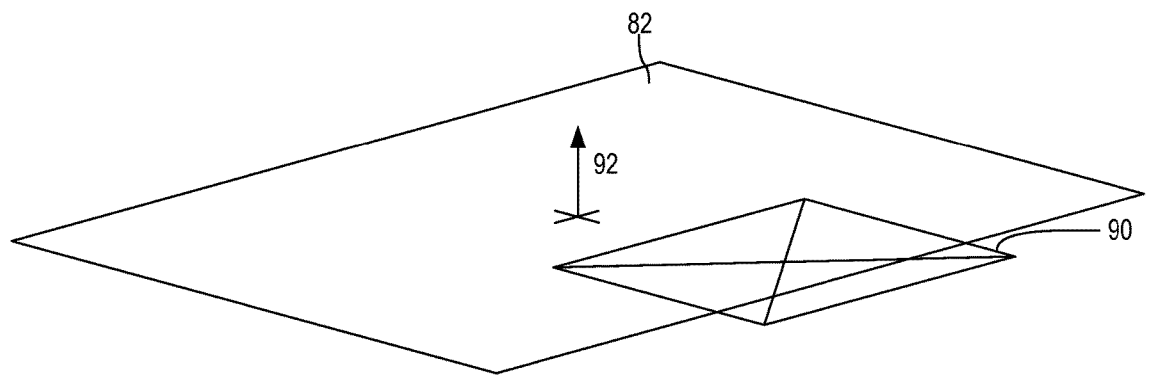

FIG. 5 illustrates the functioning of the content rendering module 22 and the projector 24 in FIG. 1. The content rendering module 22 provides the content 16 in its calculated orientation to the projector 24 based on the size determination of the content size determination module 54 and the surface selection module 52. The viewer views the content 16 as a rendering 98 that is placed in three-dimensional space on and coplanar with the surface area 86. The content 16 is not rendered on the surface areas 82 and 84. All other surface characteristics being equal, the surface area 86 provides an optimal area for the rendering 98 when compared to the surface areas 82 and 84, because of the user orientation as represented by the user orientation vector 66. The rendering 98 remains static on the surface area 86 when the user orientation vector changes by a small degree. If the viewer orientation determination module 48 in FIG. 1A senses that the user orientation vector changes by more than a predetermined threshold degree, for example by five degrees, the system automatically proceeds to recalculate all dot-products as described above and, if necessary, reposition and resize the content that is being rendered for display to the user. Alternatively, the system my routinely, e.g. every 15 seconds recalculate all dot-products and place content as described above.

Alternatively, the user may select the area 86 for the content to remain even when they change their orientation.

Figure 6:
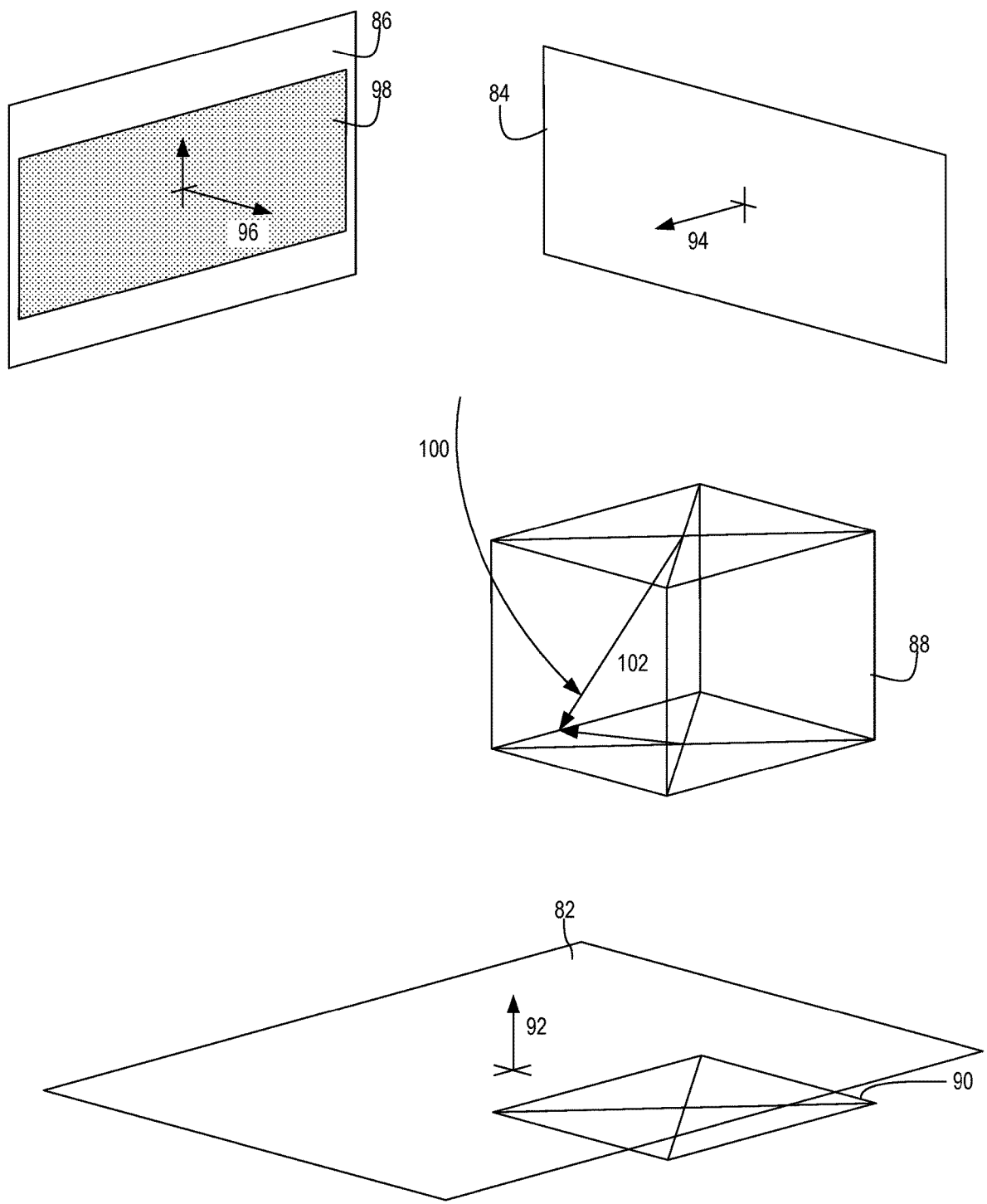
FIG. 6 is a view similar to FIG. 5 illustrating a change in the user orientation vector.

In FIG. 6, the user 60 changes the inclination of their head. As a result, the user orientation vector 66 rotates in a downward direction 100. A new user orientation is represented by a new user orientation vector 102. The cameras 32 in FIGS. 1A and 1B continually capture images of the real world objects 14. Additional sensors such as the depth sensor 28 and the accelerometer 30 may also continually capture and provide updated information. The viewer orientation determination module 48 processes the images, along with other data captured by sensors on board the augmented reality viewer 12, to determine relative movement of the real world objects 14 within a view of the camera 32. The viewer orientation determination module 48 then processes such movement to determine the change of the user orientation vector from the user orientation vector 66 in FIG. 5 to the user orientation vector 102 in FIG. 6. The system normally selects the surface with the most optimal dot-product, although there may be some tolerance/range allowable for the dot-product so that jitter and processing is reduced. By way of example, the system may move the content when there is another dot-product that is more optimal and if the dot-product that is more optimal is at least 5 percent better than the dot-product of the surface where the content is currently displayed.

Assuming that the user did not select the surface 86 for the content to remain after they change their orientation. the surface selection module 52 again calculates three dot products, namely between the user orientation vector 102 and the surface area orientation vector 92, the user orientation vector 102 and the surface area orientation vector 94, and the user orientation vector 102 and the surface area orientation vector 96. The surface selection module 52 then determines which one of the three dot products is the most negative. In the present example, the dot product between the user orientation vector 102 and the surface area orientation vector 92 is the most negative. The surface selection module 52 determines that the surface area 82 is the preferred surface because its associated dot product is more negative than for the surface areas 84 and 86. The system may also consider other factors as described above.

The content placement and content orientation unit 36 in FIG. 1A invokes the content vector calculator 56 and the content orientation selection module 58. Following operation of the content orientation selection module 58, the content size determination module 54 is again invoked.

Figure 7:
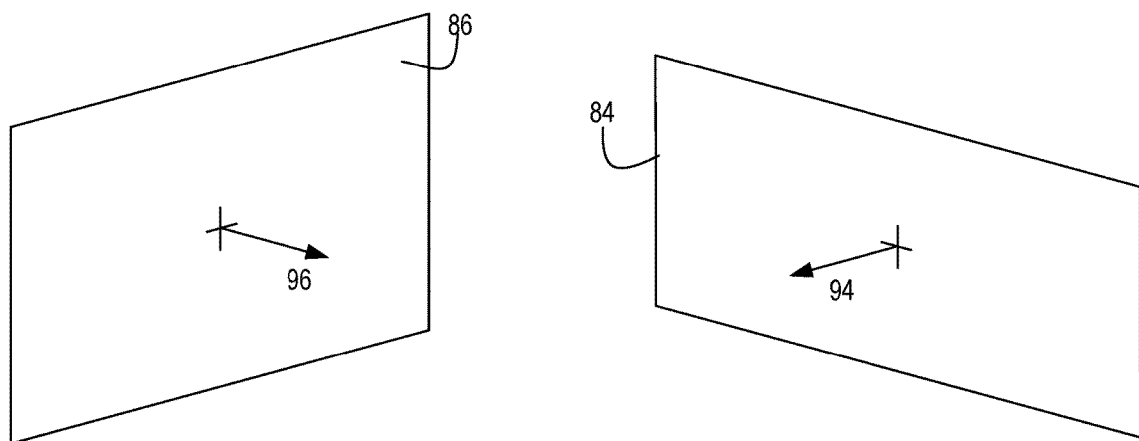
FIG. 7 is a view similar to FIG. 6 illustrating placement of a rendering of the content due to the change in the user orientation vector.
Figure 7:
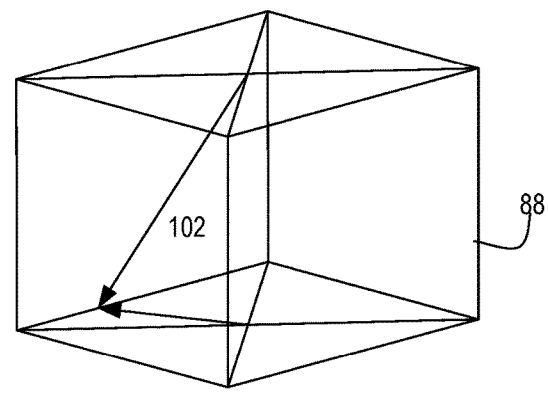
Figure 7:
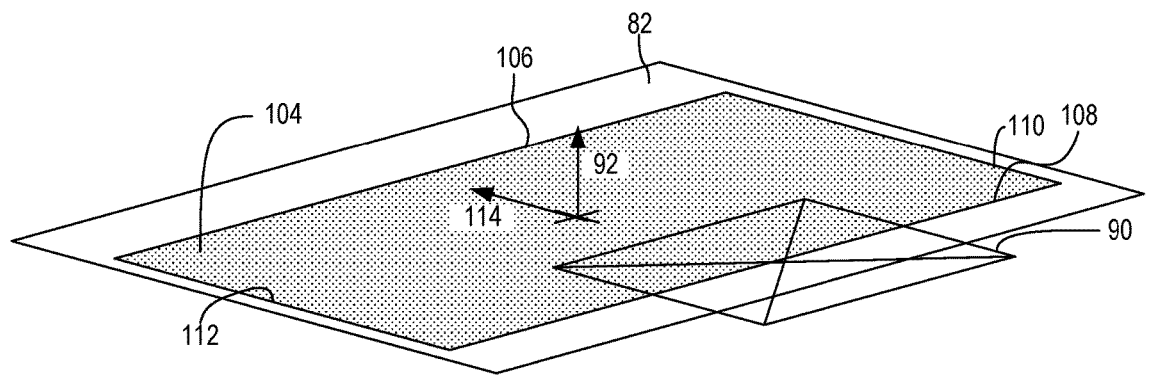

The functioning of the content vector calculator 56, content orientation selection module 58 and content size determination module 54 are better illustrated with the assistance of FIG. 7.

FIG. 7 illustrates that the content rendering module 22 and projector 24 create a rendering 104 of the content 16 within and coplanar with the surface area 82. The rendering on the surface area 86 is no longer displayed to the user 60.

The rendering 104 has a far edge 106, a near edge 108, a right edge 110 and a left edge 112. The content vector calculator 56 in FIG. 1A may calculate a content orientation vector 114. The content orientation vector 114 extends from the near edge 108 to the far edge 106 and is orthogonal to both the near edge 108 and the far edge 106.

The calculations that are made by the content vector calculator depend on the content that is provided on the data channel. Some content my already have a content orientation vector extends from the near edge to the far edge of the content, in which case the content vector calculator 56 simply identifies and isolates the content orientation vector within the code of the content. In other instances, a content orientation vector may be associated with the content and the content vector calculator 56 may have to re-orient the content orientation vector to extend from the near edge to the far edge of the content. In other instances, no the content vector calculator 56 may generate a content orientation vector based on other data such as image analysis, the placement of tools in the content, etc.

The content orientation selection module 58 calculates a dot product between the user orientation vector 102 and the content orientation vector 114. The dot product is calculated for four scenarios, namely when the content orientation vector 114 is oriented in the direction shown in FIG. 7, when the content orientation vector 114 is oriented 90° to the right, when the content orientation vector 114 is oriented 180°, and when the content orientation vector 114 is oriented 90° to the left. The content orientation selection module 58 then selects the dot product that is the lowest among the four dot products and places the rendering 104 so that the content orientation vector 114 is aligned in the direction with the lowest associated dot product. The near edge 108 is then located closer to the user 60 than the far edge 106 and the right and left edges 112 and 110 are located to the right and to the left from the orientation of the user 60 as depicted by the user orientation vector 102. The content 16 is thus oriented in a manner that is easily viewable by the user 60. For example, a photograph of a head and torso of a person is displayed with the head farthest from the user 60 and the torso closest to the user 60, and a text document is displayed with the first lines farthest from the user 60 and the last lines closest to the user 60.

The content size determination module 54 has determined an appropriate size for the rendering 104 with the right edge 110 and the left edge 112 defining the width of the rendering 104 within the surface area 82 and a distance between the far edge 106 and the near edge 108 being determined by the desired aspect ratio.

Figure 8:
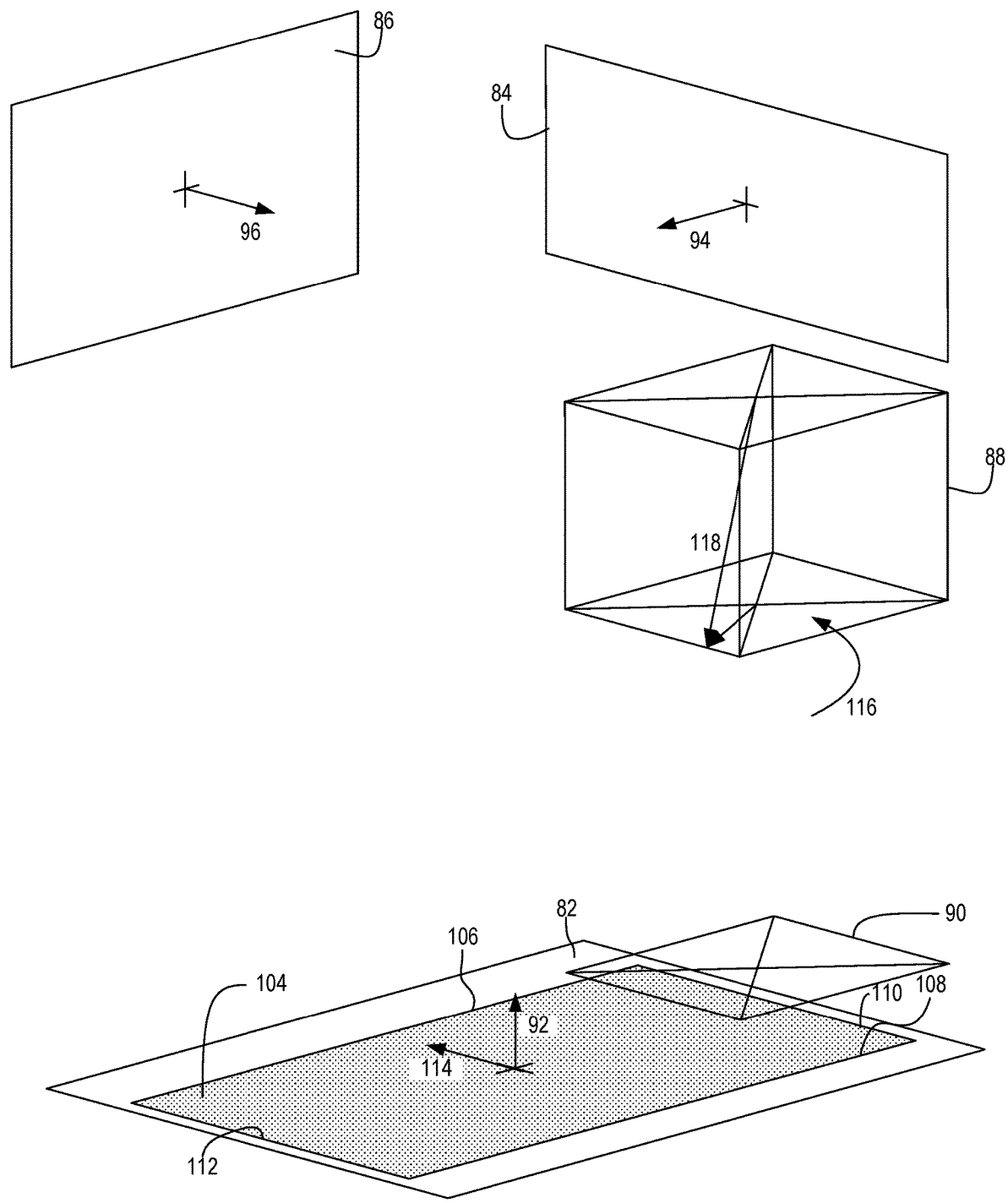
FIG. 8 is a view similar to FIG. 7 illustrating a change in the user orientation vector due to movement of the user.

In FIG. 8, the user 60 has moved in a direction 116 counterclockwise around the surface area 82. The user 60 has also rotated their body counterclockwise by 90°. The user 60 has now established a new orientation as represented by a new user orientation vector 118. The user's head is still inclined downward toward the surface area 82 and the surface areas 84 and 86 are now located behind and to the right of the user 60, respectively.

The surface selection module 52 again calculates a dot product associated with each one of the surface area orientation vectors 92, 94 and 96. The dot product of the user orientation vector 118 and the surface area orientation vector 94 has now become positive. The dot product between the user orientation vector 118 and the surface area orientation vector 96 is approximately zero. The dot product between the user orientation vector 118 and the surface area orientation vector 92 is the most negative. The surface selection module 52 in FIG. 1A selects the surface area 82 associated with the surface area orientation vector 92 as the preferred surface for positioning of a rendering of the content 16.

The content orientation selection module 58 in FIG. 1A again calculates four dot products, each one associated with a respective direction of a content orientation vector, namely a dot product between the user orientation vector 118 and the content orientation vector 114 in the direction shown in FIG. 8, and further dot products respectively between the user orientation vector 118 and content orientation vectors at 90° to the right, 180° and 90° to the left relative to the content orientation vector 114 in FIG. 8. The content orientation selection module 58 determines that the dot product associated with the content orientation vector 114 that is 90° to the left relative to the direction of the content orientation vector 114 shown in FIG. 7 is the most positive of the four dot products.

The content size determination module 54 then determines an appropriate size for the rendering if the content orientation vector 114 is rotated 90° to the left.

Figure 9:
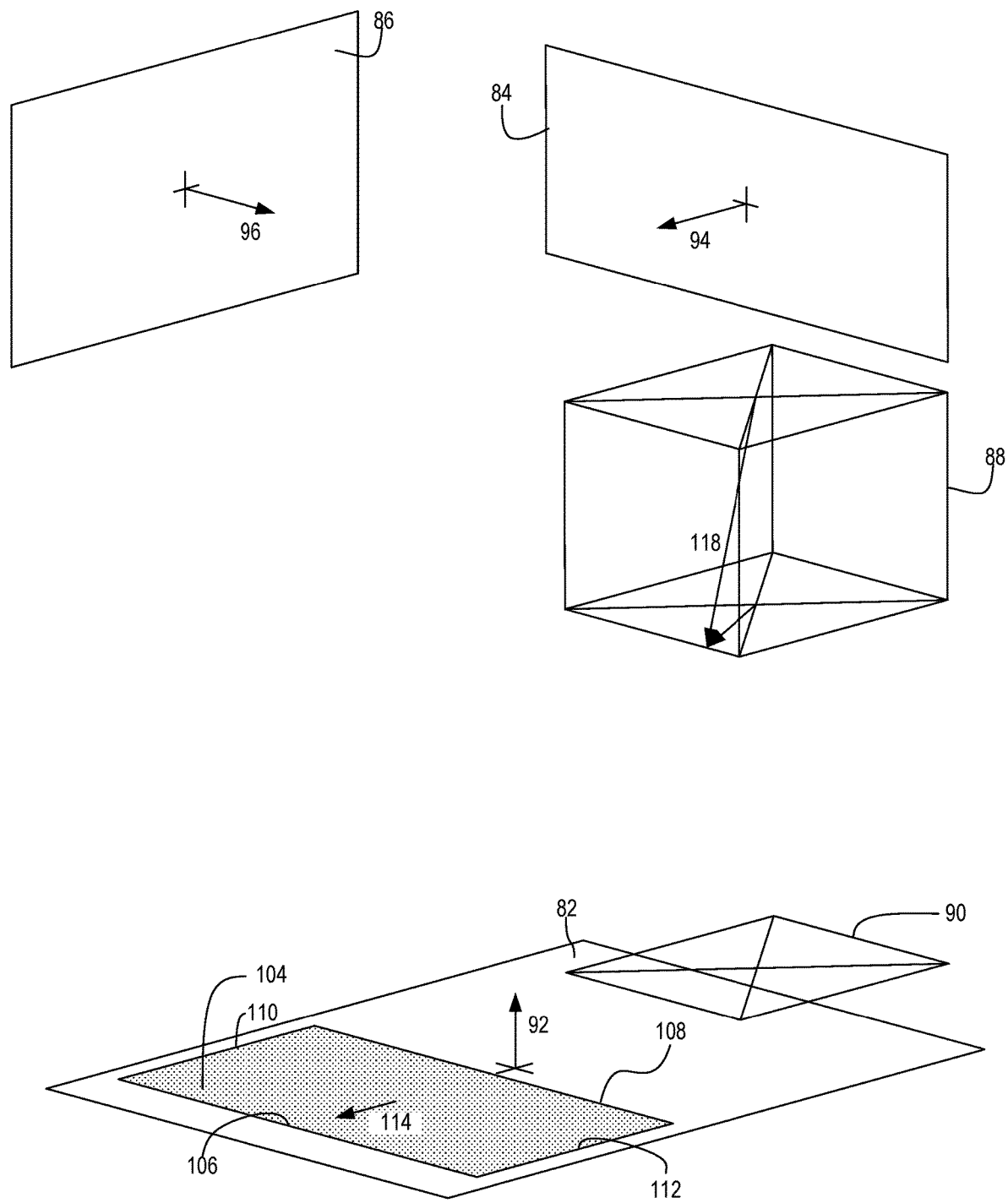
FIG. 9 is a view similar to FIG. 8 illustrating rotation of the rendering of the content due to the change in the user orientation vector.

FIG. 9 illustrates how the content rendering module 22 creates the rendering 104 based on the user orientation as represented by the user orientation vector 118. The rendering 104 is rotated 90° counterclockwise so that the content orientation vector 114 is directed 90° to the left when compared to FIG. 8. The near edge 108 is now located closest to the user 60. The content size determination module 54 in FIG. 1A has made the rendering 104 smaller than in FIG. 8 due to the available proportions of the surface area 82. Renderings could snap between positions, smoothly rotate, fade in/fade out as selected by the content creator or by user preference.

Figure 10:
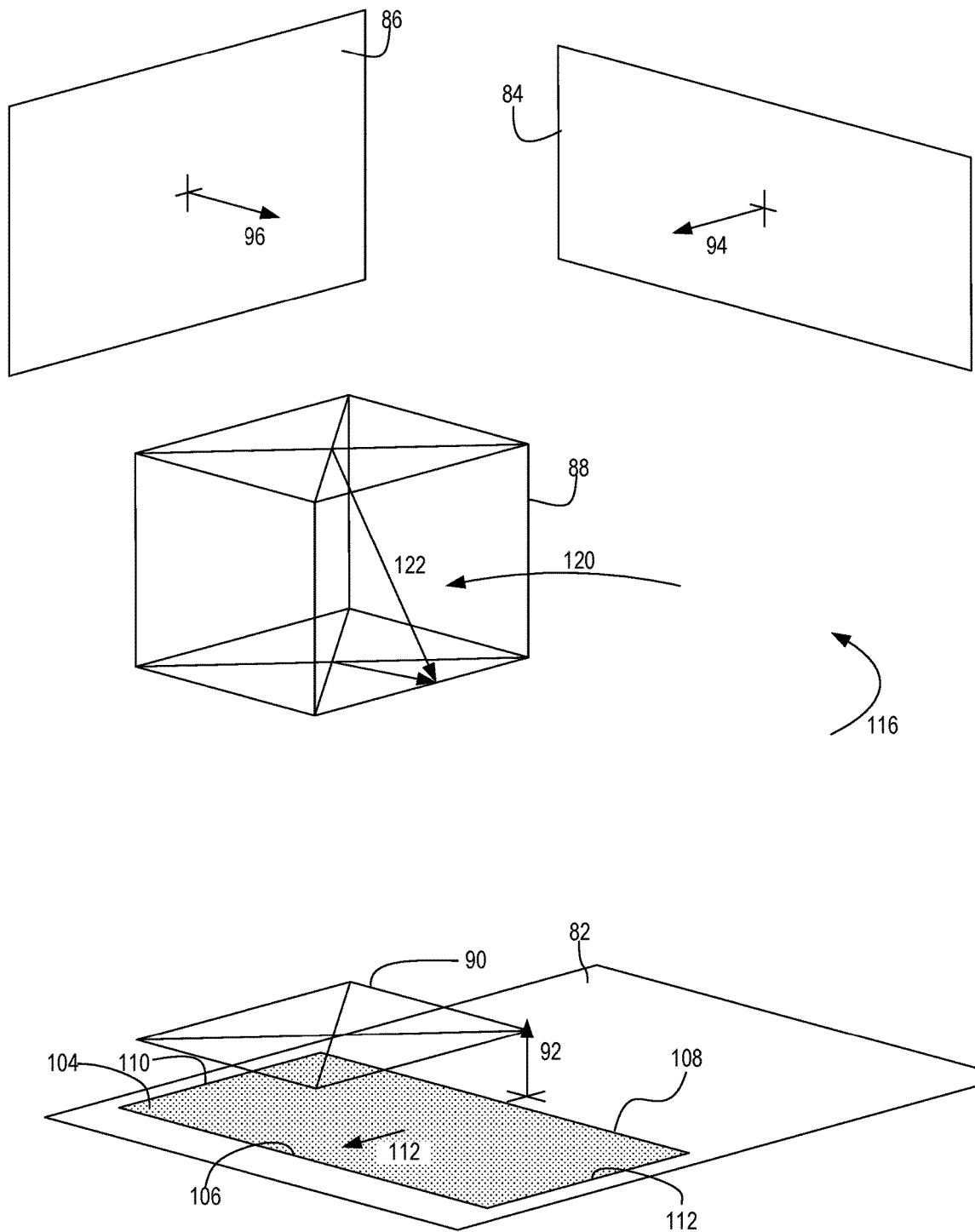
FIG. 10 is a view similar to FIG. 9 illustrating a change in the user orientation vector due to movement of the user.

In FIG. 10, the user 60 has moved further around the surface area 82 in a direction 120 and has established a new user orientation as represented by a new user orientation vector 122. The dot product between the user orientation vector 122 and the surface area orientation vector 96 is now positive. The dot product between the user orientation vector 122 and the surface area orientation vector 94 is approximately zero. The dot product between the user orientation vector 122 and the surface area orientation vector 92 is the most negative. The surface area 82 is thus the preferred surface for displaying content.

Figure 11:
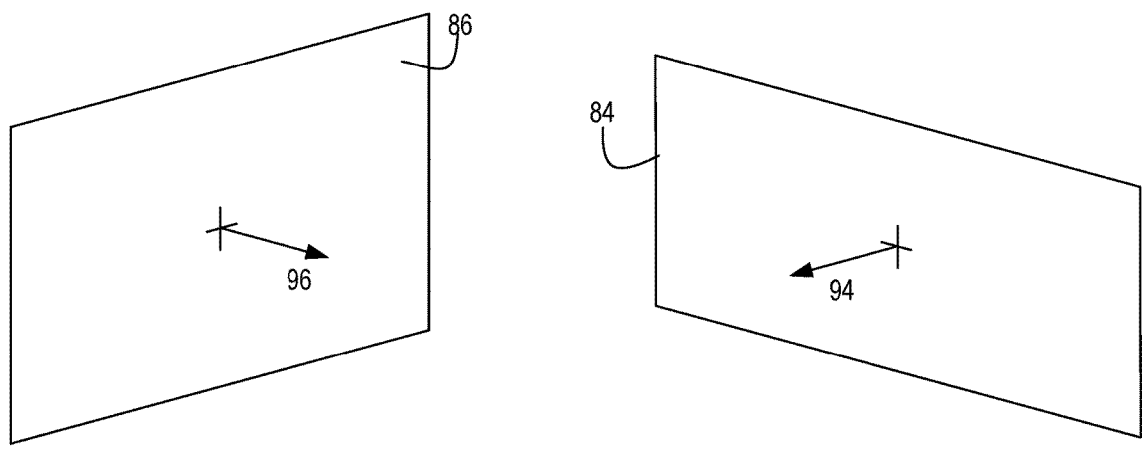
FIG. 11 is a view similar to FIG. 10 illustrating rotation of the rendering of the content due to the change in the user orientation vector.
Figure 11:
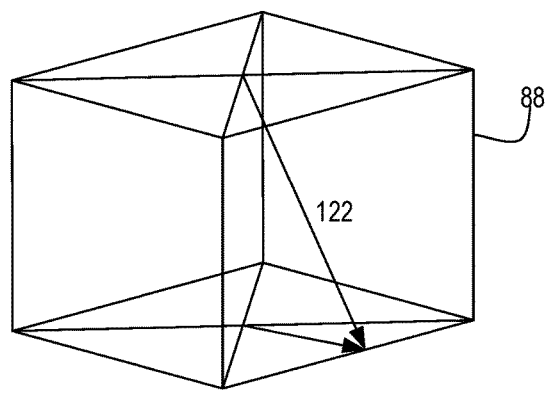
Figure 11:
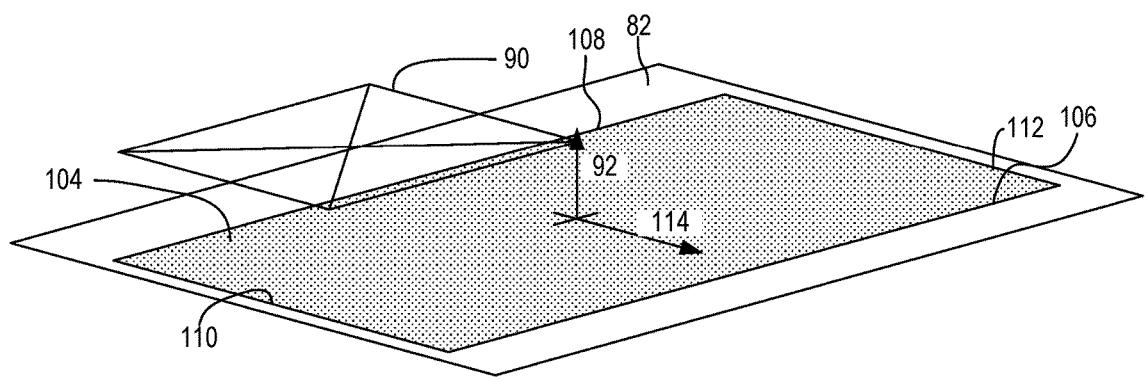

The dot product between the user orientation vector 122 and the content orientation vector 114 as shown in FIG. 10 is approximately zero. If the content orientation vector 114 is rotated 90° clockwise, 180° and 90° counterclockwise, the respective dot products differ in magnitude with the dot product of the content orientation vector 114 that is 90° to the left being the most positive. The rendering 104 should thus be rotated 90° counterclockwise and be resized based on the proportions of the surface area 82. FIG. 11 illustrates how the rendering 104 is rotated and resized due to the change in the user orientation vector 122 while remaining on the surface area 82.

Figure 12:
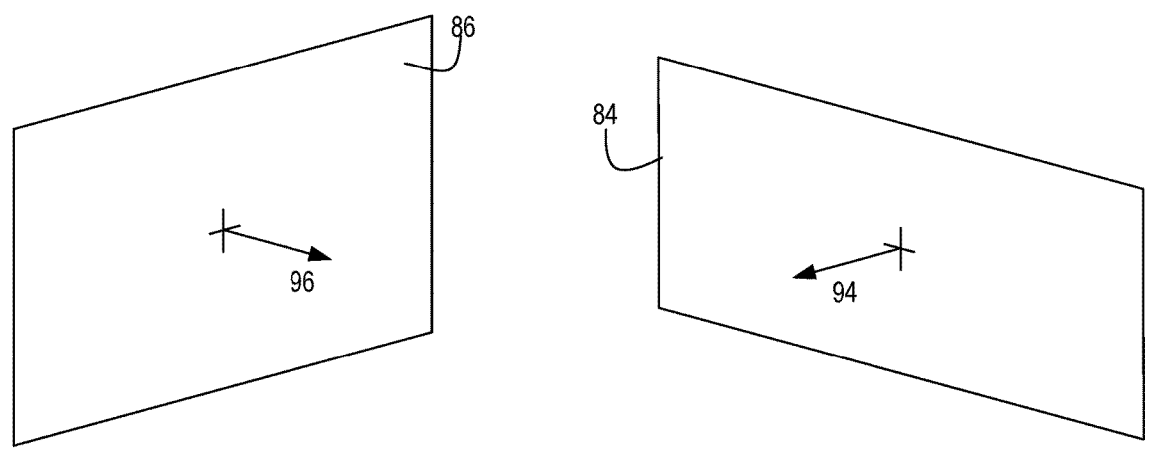
FIG. 12 is a view similar to FIG. 11 illustrating a change in the user orientation vector due to movement of the user.
Figure 12:
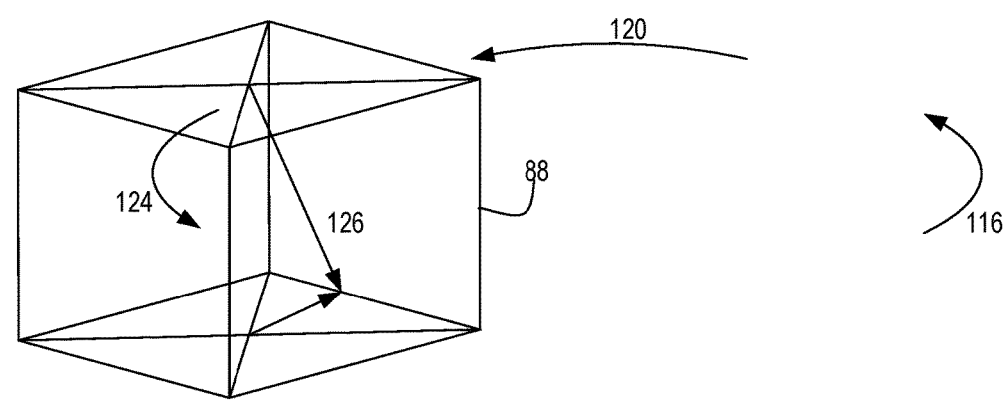
Figure 12:
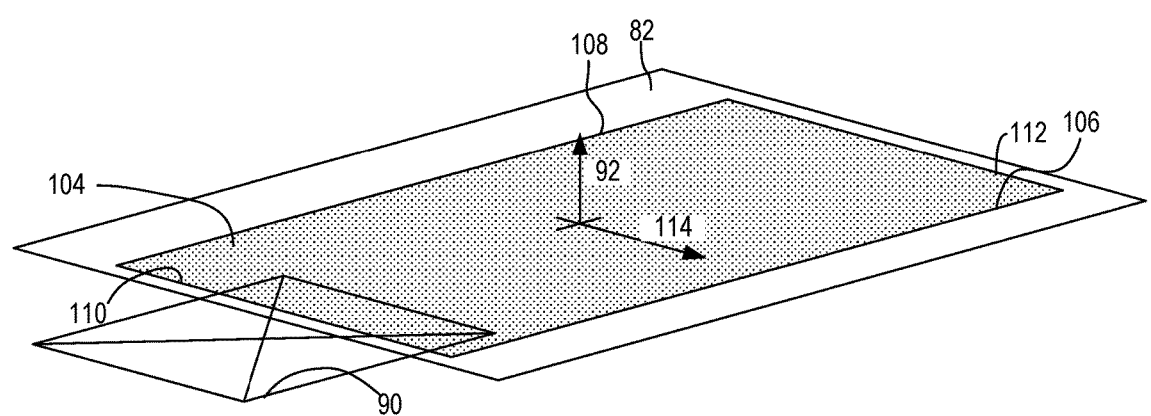

In FIG. 12, the user 60 has moved in a direction 124 around the surface area 82 and has established a new user orientation as represented by a new user orientation vector 126. A dot product of the user orientation vector 126 and the surface area orientation vector 94 is now negative. However, a dot product between the user orientation vector 126 and the surface area orientation vector 92 is more negative. The surface area 82 is thus the preferred surface area for creating a rendering of the content 16.

Figure 13:
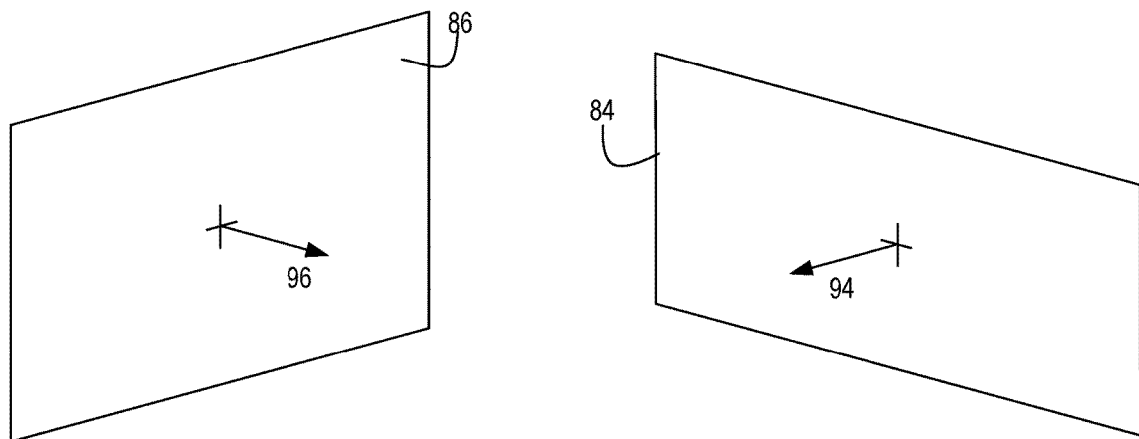
FIG. 13 is a view similar to FIG. 12 illustrating rotation of the rendering of the content due to the change in the user orientation vector.
Figure 13:
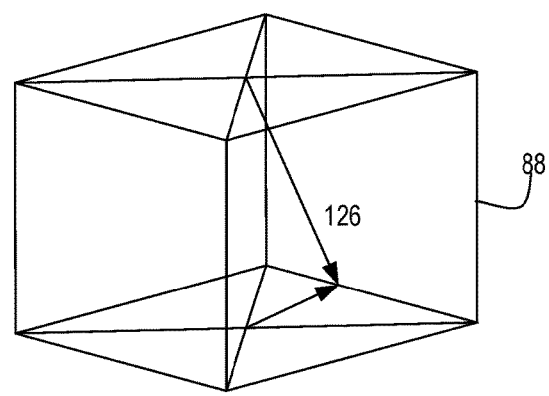
Figure 13:
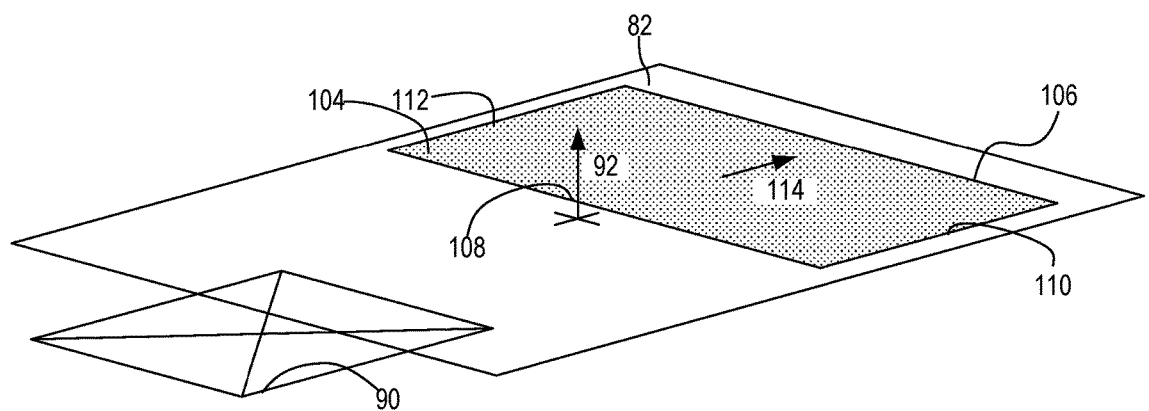

A dot product between the user orientation vector 126 and the content orientation vector 114 as shown in FIG. 12 is approximately zero. A dot product between the user orientation vector 126 and the content orientation vector 114, if it is rotated 90° to the left, is positive. The rendering 104 should thus be rotated counterclockwise while remaining on the surface area 82. FIG. 13 illustrates the placement, orientation and size of the rendering 104 as modified based on the new user orientation vector 126.

Figure 14:
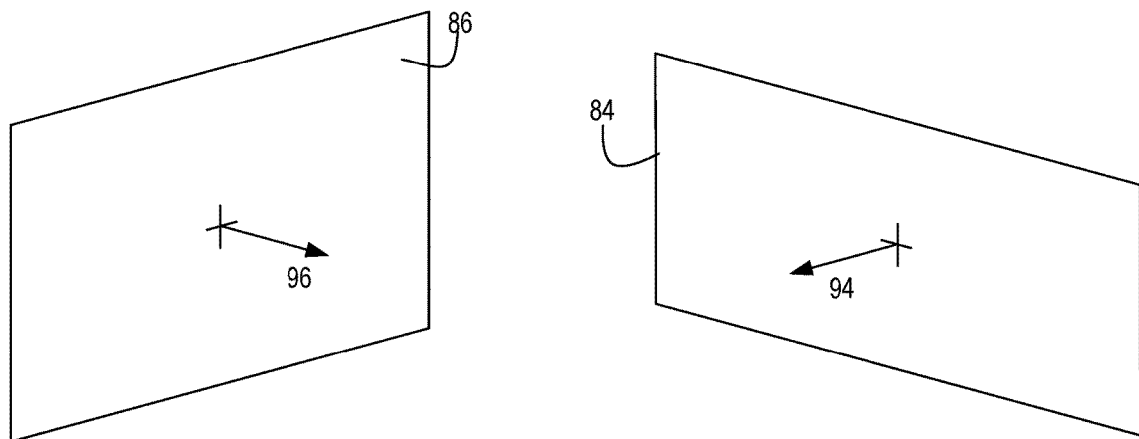
FIG. 14 is a view similar to FIG. 13 illustrating a change in the user orientation vector due to the user looking up.
Figure 14:
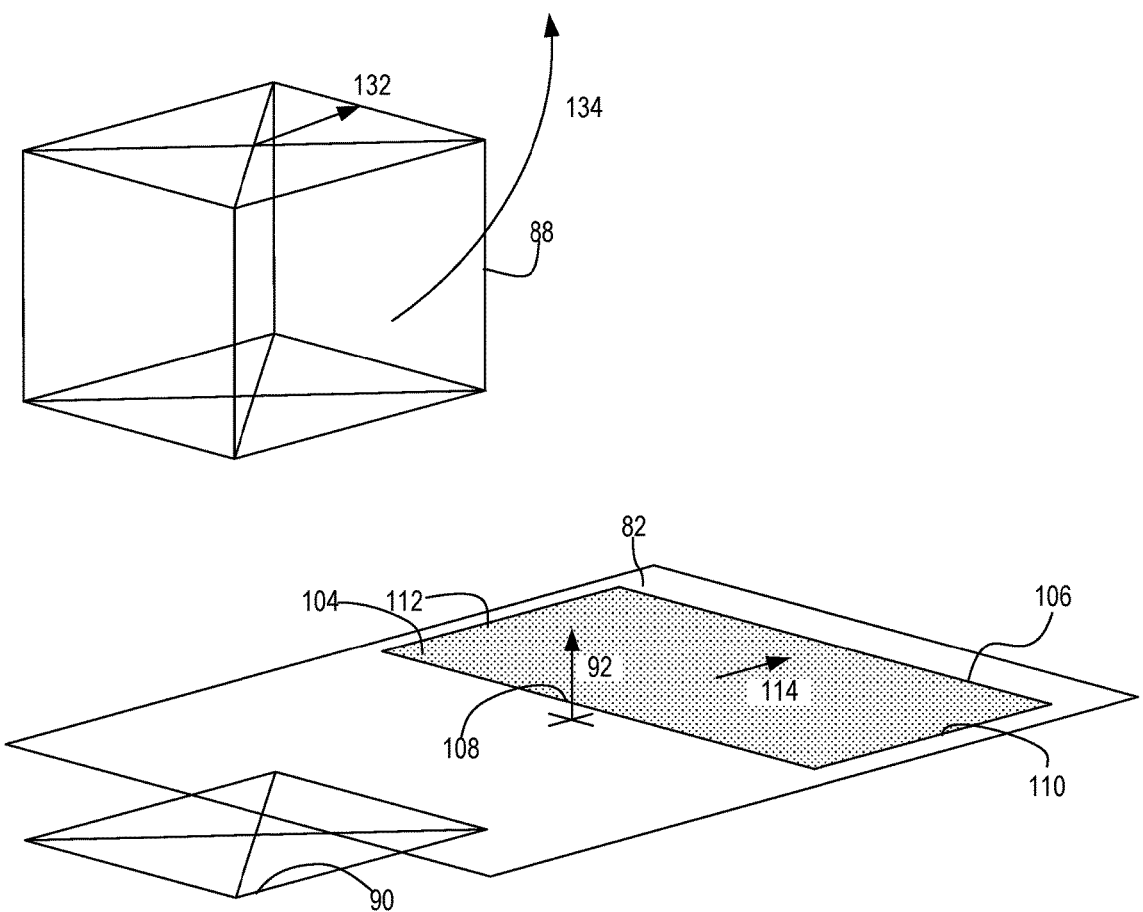
Figure 15:
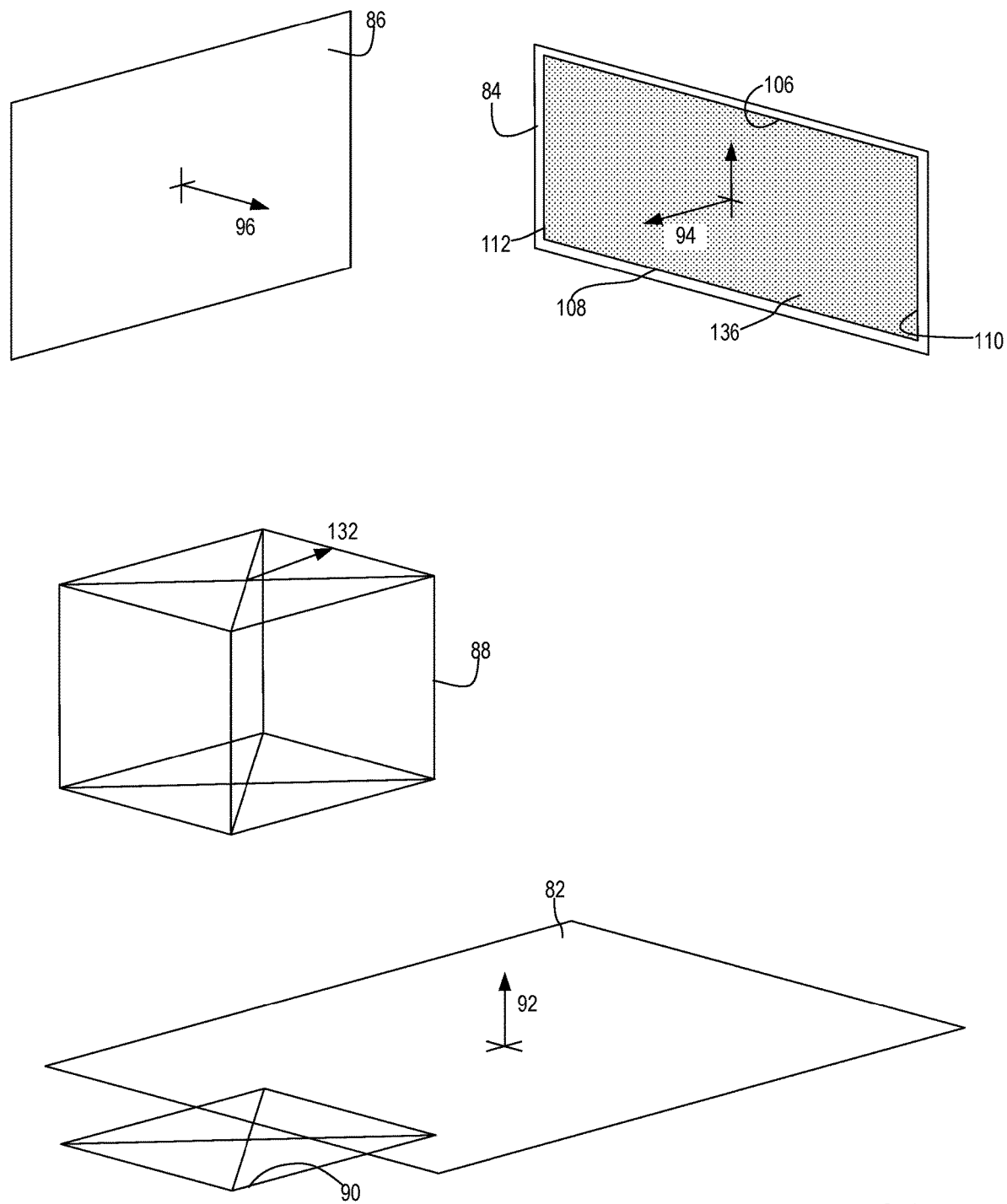
FIG. 15 is a view similar to FIG. 14 illustrating the placement of a rendering of the content on another surface area due to the change in the user orientation vector.

FIG. 14 illustrates a new user orientation vector 132 that is established when the user 60 rotates their head in an upward direction 134. A dot product between the user orientation vector 132 and the surface area orientation vector 92 is approximately zero. A dot product between the user orientation vector 132 and the surface area orientation vector 96 is also approximately zero. A dot product between the user orientation vector 132 and the surface area orientation vector 94 is, or approaches −1 and is thus the most negative of the three surface-based dot products. The surface area 84 is now the preferred surface area for placement of a rendering of the content 16. FIG. 15 illustrates a rendering 136 that is displayed to the user 60 on the surface area 84. The rendering on the surface area 82 is no longer displayed to the user 60. On vertical surface areas such as the surface area 84 and the surface area 86, the near edge 108 is always at the bottom.

Figure 16:
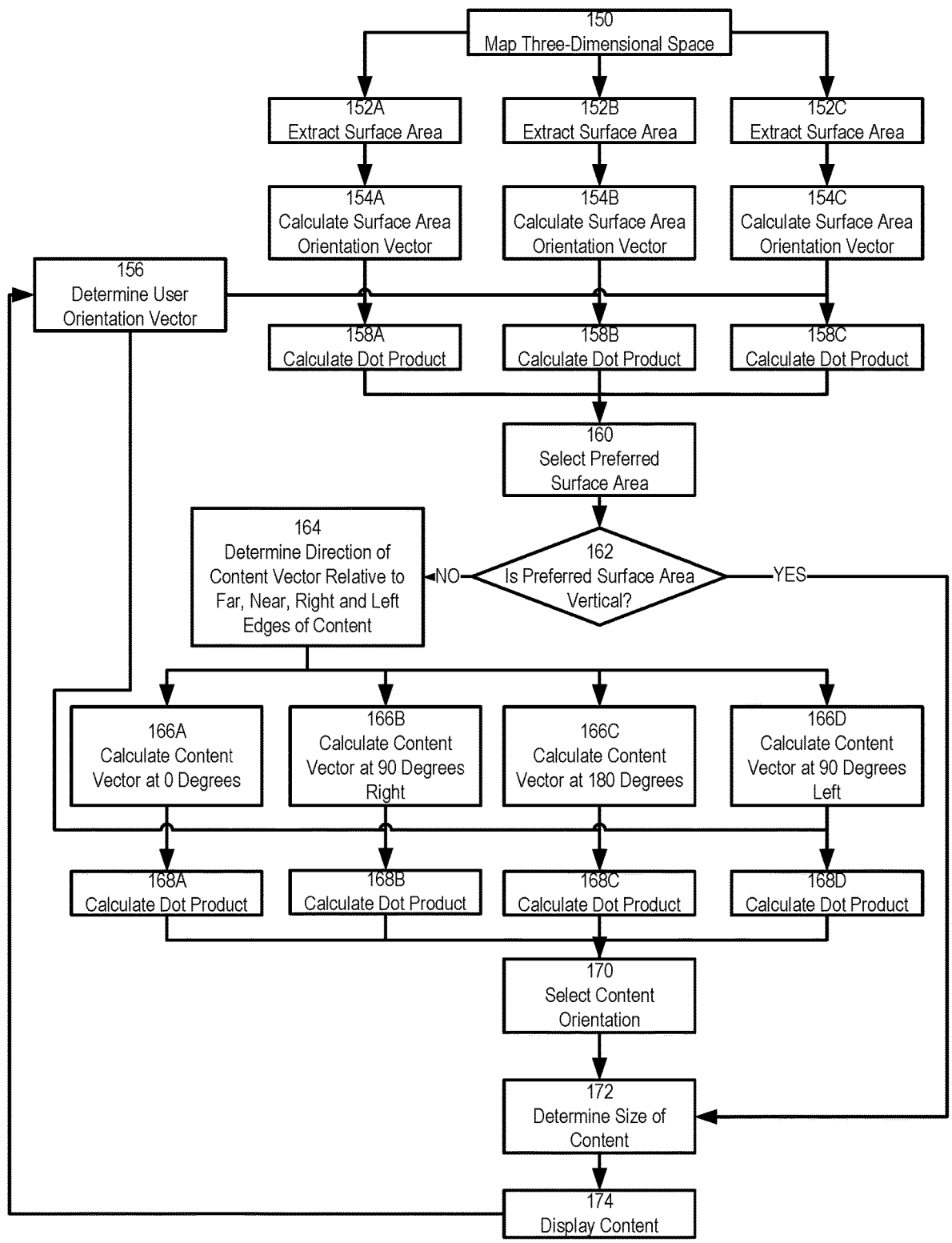
FIG. 16 is a flow chart illustrating the functioning of an algorithm to carry out the method of the preceding figures.

FIG. 16 illustrates the algorithm for carrying out the method as described above. At 150, the three-dimensional space is mapped as described with reference to FIG. 3. At 152A, B and C, the surface areas are extracted as described with reference to FIG. 4. At 154A, B and C, the surface vectors are calculated as described with reference to FIG. 4. At 156, a user orientation vector is determined as described with reference to FIGS. 1 to 4. At 158A, B and C, a respective dot product is calculated between the user orientation vector and each respective surface area orientation vector, as described with reference to FIG. 4. At 160, a preferred surface area is determined as described with reference to FIG. 4.

At 162, a determination is made whether the preferred surface area is vertical. If the preferred surface area is not vertical then, at 164, a direction of a content orientation vector relative far, near, right and left edges of the content is determined as described with reference to FIG. 7. Following 164, at 166A, B, C and D, content vectors are calculated at 0°, 90° right, 180° and 90° left as described with reference to FIG. 7. At 168A, B, C and D, a dot product is calculated between the user orientation vector and the content orientation vectors calculated at 166A, B, C and D, respectively. At 170, a content orientation is selected as described with reference to FIG. 7.

At 172, the size of the content is determined as described with reference to FIG. 5 and FIG. 7. At 174, the content is displayed as described with reference to FIG. 5 and FIG. 7.

Following 174, a new user orientation vector may be determined at 156 as described with reference to FIGS. 6, 8, 9, 10 and 12. The process may then be repeated without again calculating the surface area orientation vectors at 154A, B and C.

Figure 17:
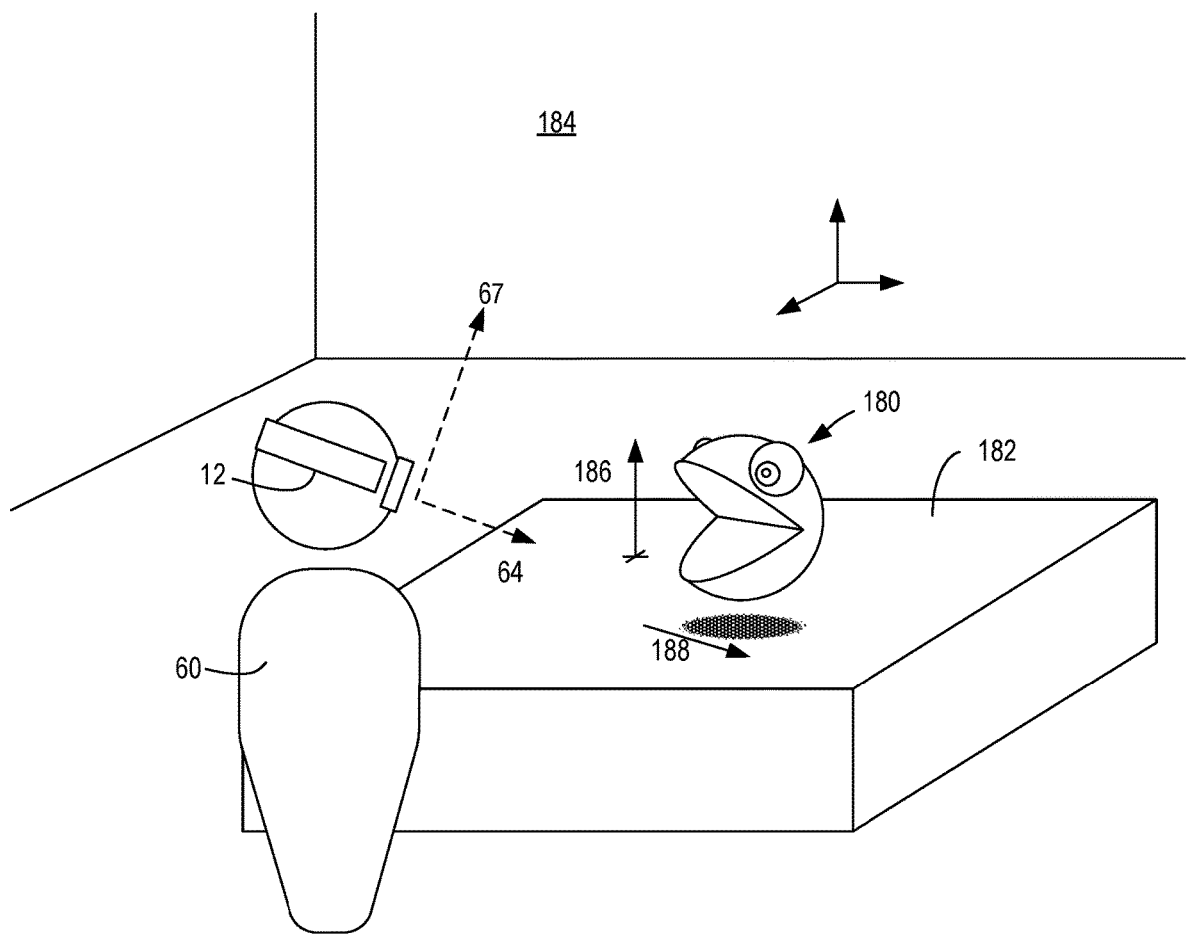
FIG. 17 is a perspective view illustrating a user wearing the augmented reality viewer in a three-dimensional environment while viewing three-dimensional content.
Figure 18:
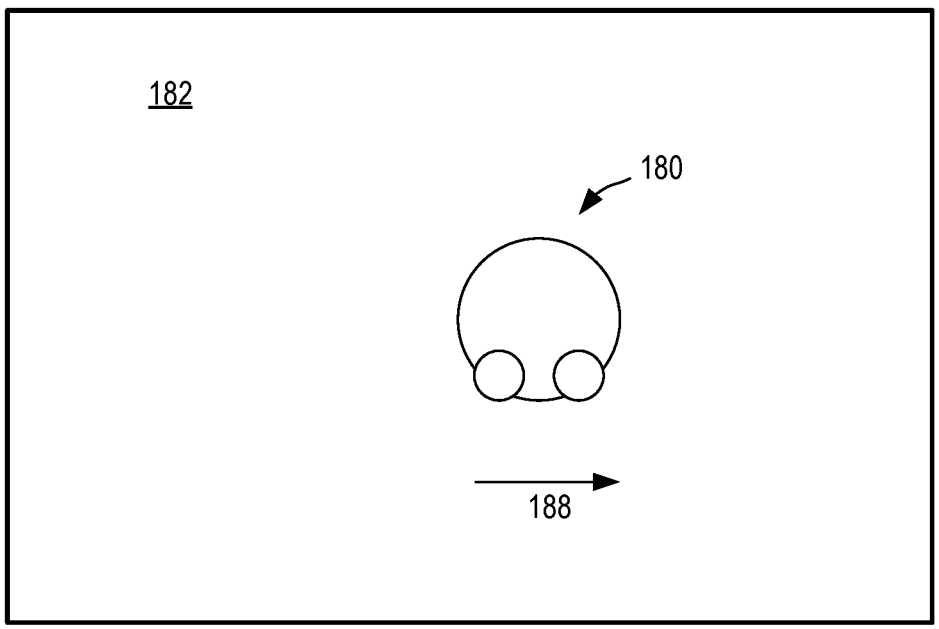
FIG. 18 is a top plan view of FIG. 17.
Figure 18:
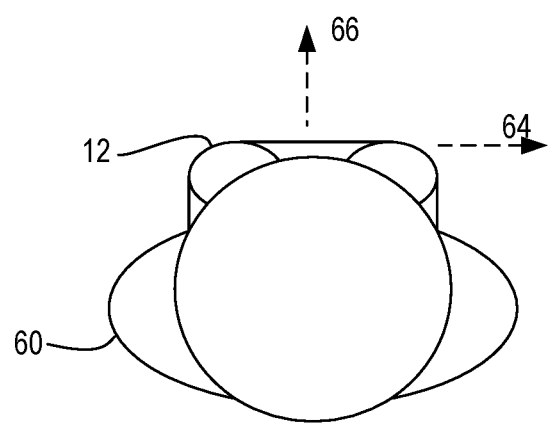

Referring to FIGS. 17 and 18, an embodiment is shown in perspective view and in top view, respectively, with three-dimensional virtual content 180 rendered on a mapped surface 182 within an environment 184 for viewing by a user 60. In such an embodiment, the principles described above are used to position the three-dimensional virtual content 180 that the user 60 can view the content as easily and naturally as possible.

The user orientation vector 66 is the same as a forward vector of the device 12 and is henceforth referred to as the "device forward vector 66". Determining a surface on which to place three-dimensional virtual content 180 may rely, at least in part, on a dot product relationship between a device forward vector 66 and a surface normal vector 186 of mapped surfaces in the environment 184. For optimal viewing of the three-dimensional virtual content 180, one of many dot product relationships may be considered optimal depending on the content. For example, if the content is meant to be viewed from the side, it may be ideal for the dot product relationship between the device forward vector 66 and the surface normal vector 186 to be close to zero indicating that the user is nearly orthogonal to the mapped surface 182. In such an embodiment, the three-dimensional virtual content 180 placed on the mapped surface 182 will be seen by the user from the side. Alternatively, a dot product relationship at or near −1 may be more desirable if the three-dimensional virtual content 180 is meant to be viewed from above, as has been described herein with respect to other embodiments. The ideal dot product relationship may be an attribute set by the creator of the three-dimensional virtual content 180, may be selected as a preference by the user, or may be otherwise determined by the augmented reality viewing system based on the type of content to be displayed.

Once a placement surface is determined, either by the system or by placement by a user, orientation of the three-dimensional virtual content 180 on the mapped surface 182 is determined with respect to the user. In the example shown, three-dimensional virtual content 180 is provided with a content orientation vector 188 that may be used to align the three-dimensional virtual content 180 to a reference vector of the user device. The three-dimensional virtual content 180 is the head of a character with a near edge of the character being where its mouth is. A far edge of the character will typically not be rendered for viewing by the user 60 because the far edge is on a side of the character that the user cannot see. The content orientation vector 188 is aligned parallel with the near edge of the character. The content orientation vector 188 may be used to align the three-dimensional virtual content 180 with the augmented reality viewer 12 such that the dot product between the content orientation vector 188 and the device right vector 64 is at or near 1, indicating that the two vectors are pointing in substantially the same direction.

Figure 19:
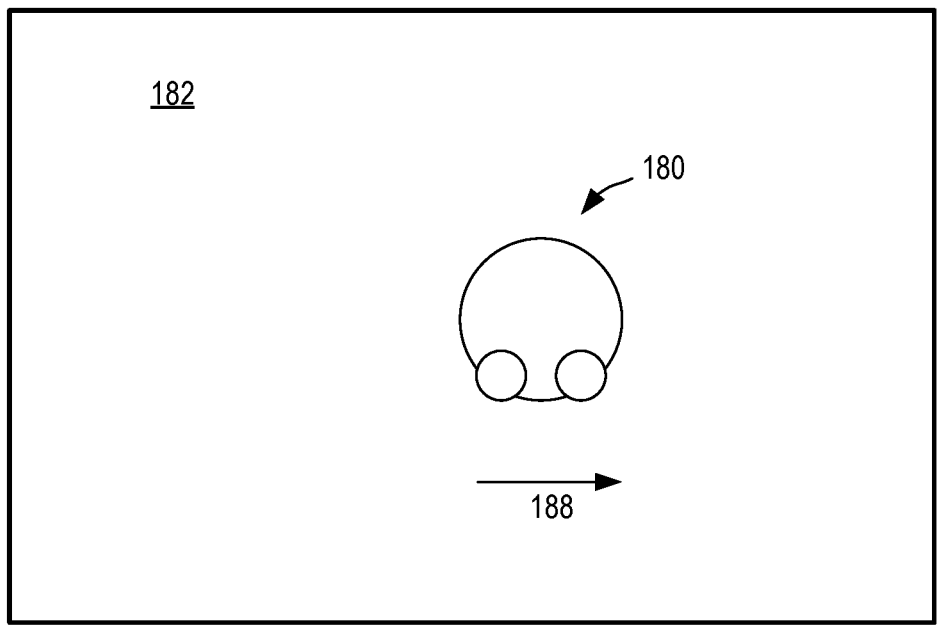
FIG. 19 is a view similar to FIG. 18 wherein the user has rotated in a clockwise direction around a display surface.
Figure 19:
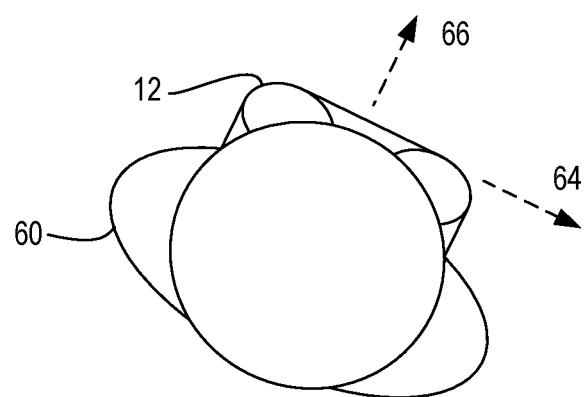
Figure 20:
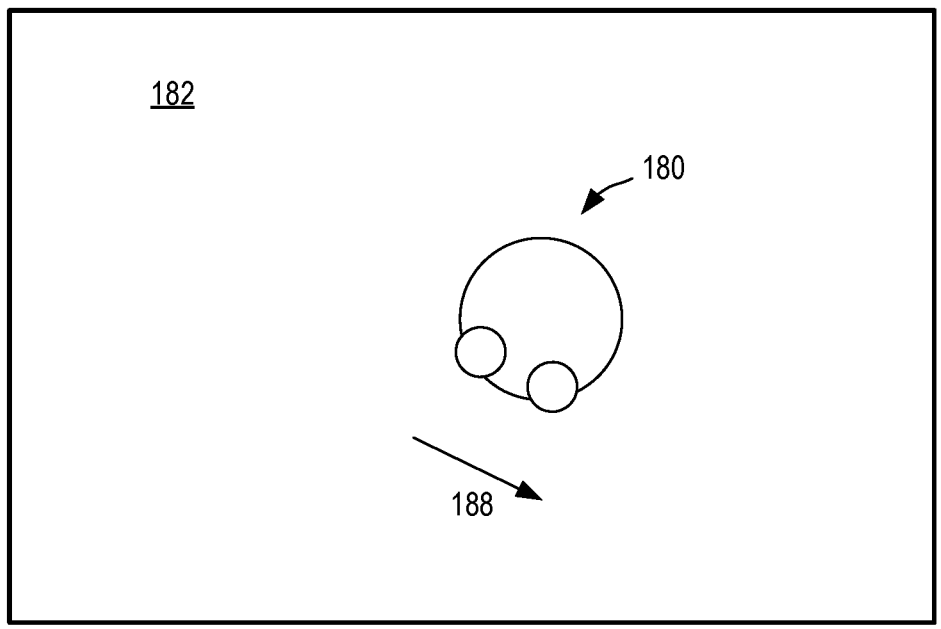
FIG. 20 is a view similar to FIG. 19 wherein the content has rotated in a clockwise direction.
Figure 20:
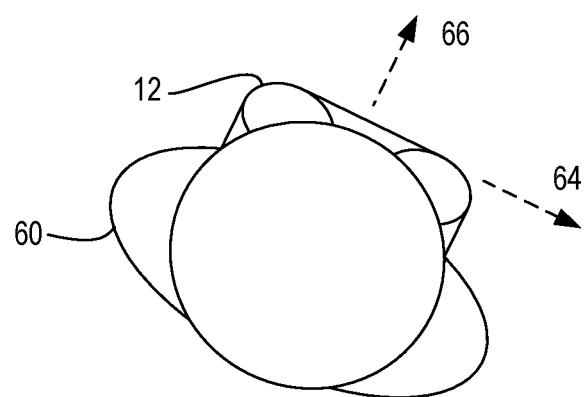

Referring to FIGS. 19 and 20, examples of three-dimensional content re-orientation based on a user's movement are shown. In FIG. 19, the user 60 has moved clockwise around the table by a certain distance and angle with respect to FIG. 18. As a result, the dot product relationship between the content orientation vector 188 and the device right vector 64 is less than 1. In some embodiments, this change in position may not require re-orientation of three-dimensional virtual content 180. For example, a content creator, a user, or software within the augmented reality viewer 12 may indicate that re-orientation of three-dimensional virtual content 180 is necessary only when the dot product between the content orientation vector 188 and a device reference vector is less than a predetermined threshold. Large or small threshold tolerances may be set depending on the type of content being displayed.

If the change in position of the user 60 from the location of FIG. 18 to the location of FIG. 19 triggers a re-orientation of three-dimensional virtual content 180, the orientation module may re-render three-dimensional virtual content 180 such that the content orientation vector 188 aligns with the device right vector 64 to result in a dot product equal to or near 1 for the two vectors, as shown in FIG. 20. As discussed above, re-orientation of three-dimensional virtual content 180 may also allow for re-sizing of the content; however, content may also remain the same size such that it appears only to re-orient about an axis normal to the mapped surface 182 as the user moves within the environment.

Figure 21:
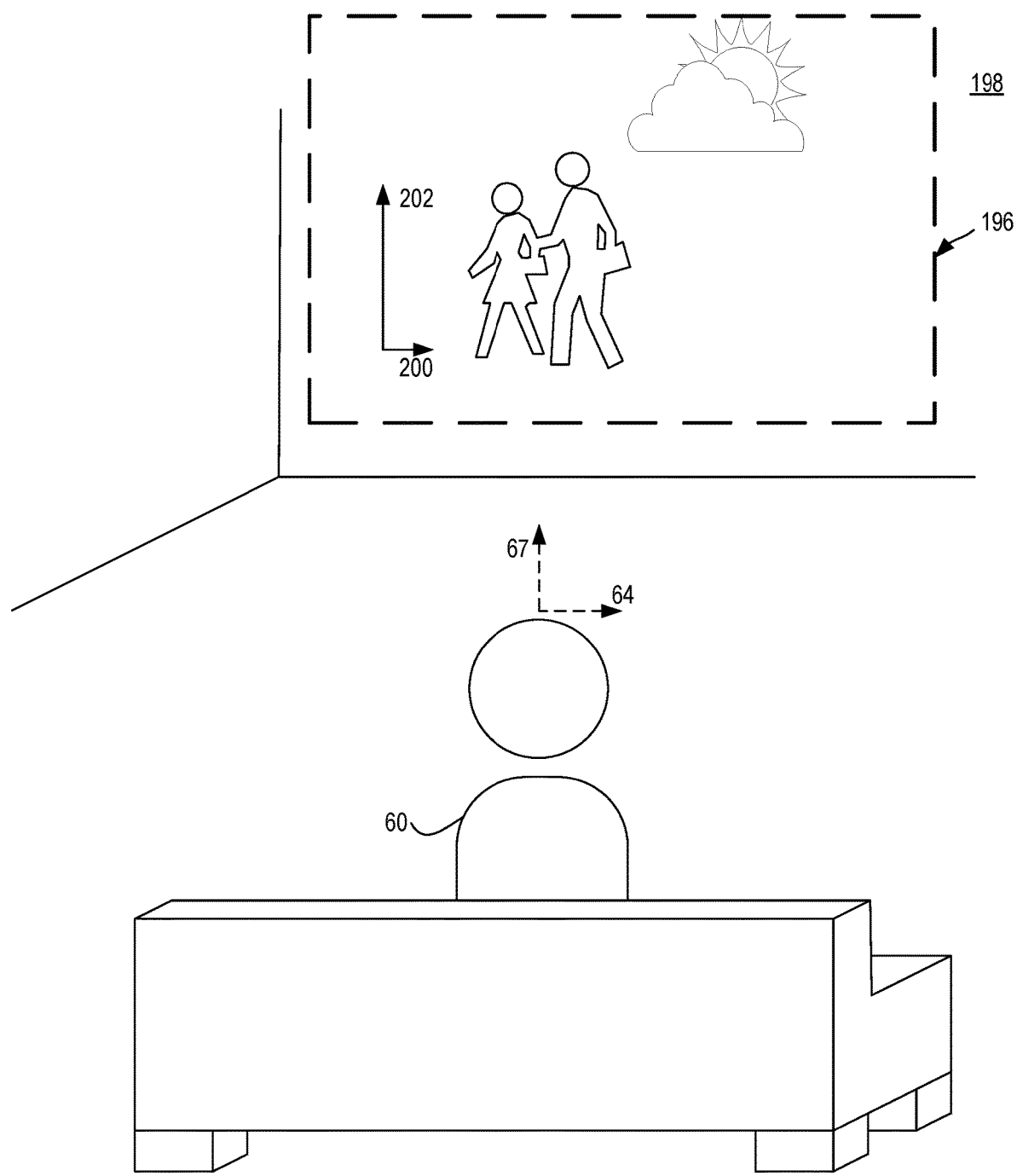
FIG. 21 is a perspective view illustrating a user while viewing content on a vertical surface.
Figure 22:
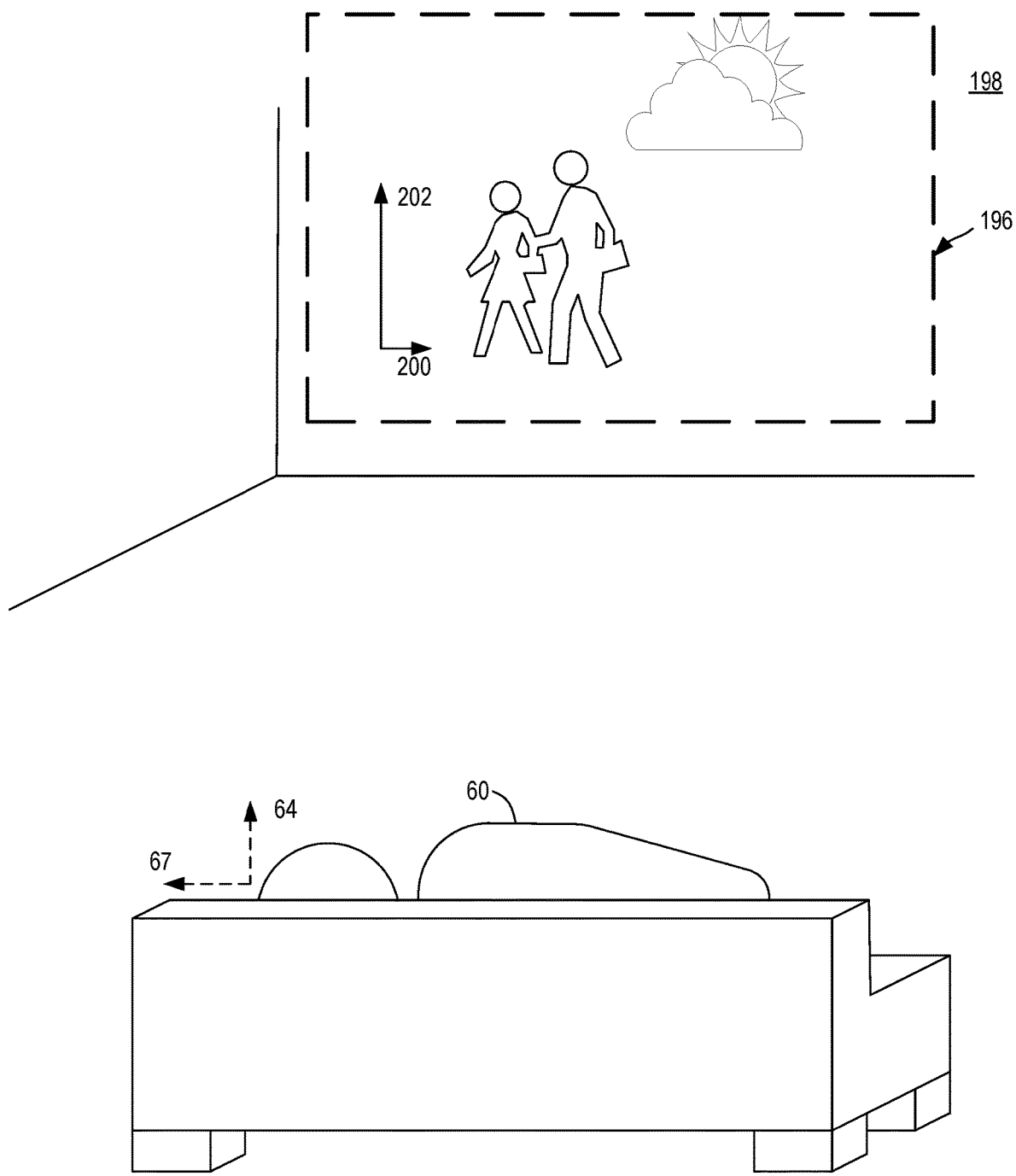
FIG. 22 is a view similar to FIG. 21 wherein the user has rotated in a counterclockwise direction.
Figure 23:
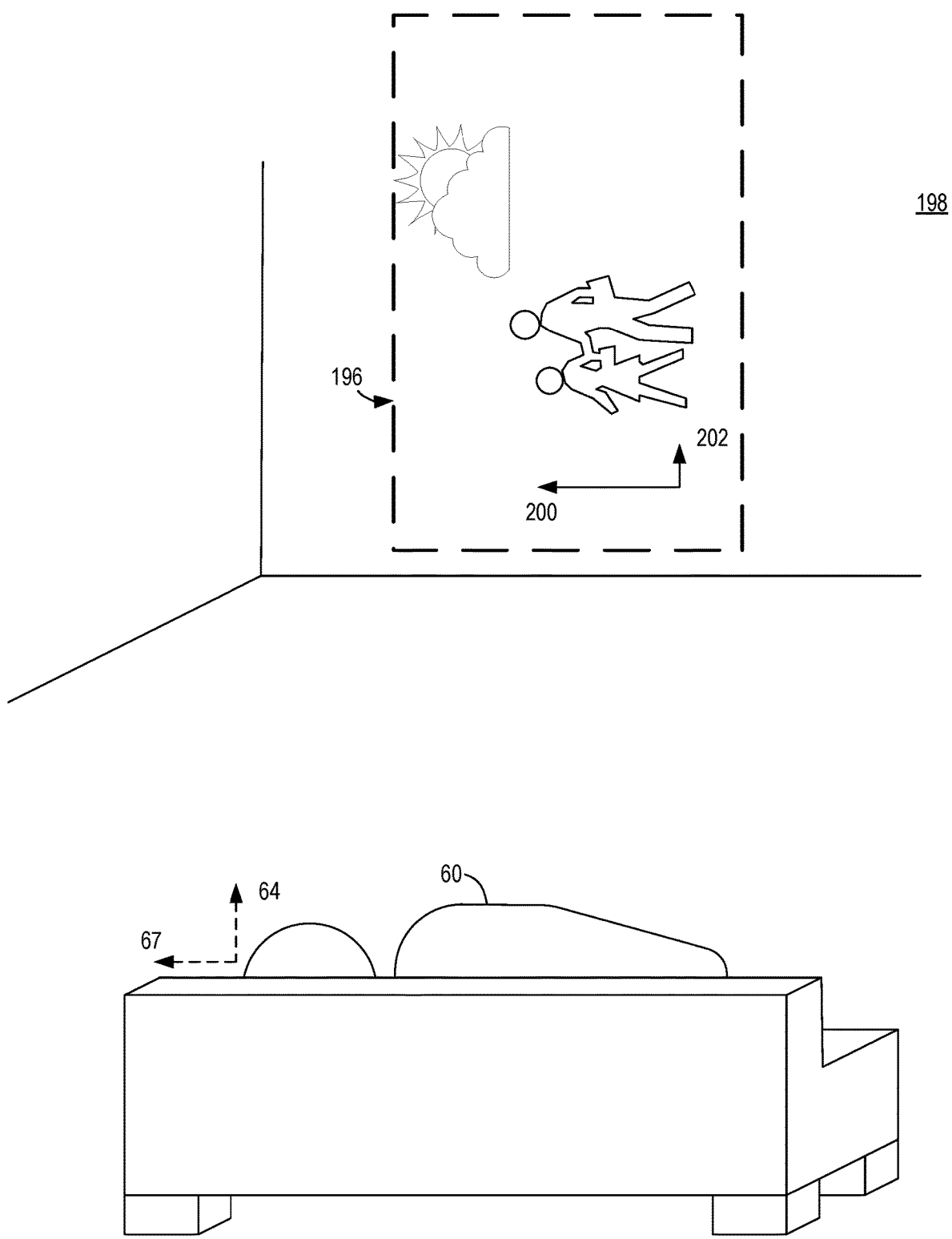
FIG. 23 is a view similar to FIG. 2 wherein the content has rotated in a counterclockwise direction.

Referring to FIGS. 21, 22 and 23, an example is shown of virtual content 196 re-orientation on a vertical surface 198. In FIG. 21, a user 60 is shown viewing virtual content 196 on a vertical surface 198 that is oriented vertically in the environment. The virtual content 196 may have at least one of a content right orientation vector 200 and a content upright orientation vector 202 which may be used to measure alignment with respect to the device right vector 64 and the device upright vector 67, respectively. In FIG. 21, the alignment between one of the content orientation vectors (200, 202) and the corresponding device orientation vectors (64, 67) results in a dot product value of approximately 1. As discussed above, dot product values closer to 1 indicate more similar alignment between the two vectors being compared.

If the user 60 were to change positions, for example by lying down on a couch as shown in FIG. 22, without re-orientation of the virtual content 196, the alignment between content orientation vectors (200, 202) and corresponding device orientation vectors (64, 67) may be near zero, indicating a less optimal alignment between the user 60 and the virtual content 196 than the alignment shown in FIG. 21. If a dot product relationship of zero is less than the required dot product relationship for the virtual content-to-user relative orientation, virtual content 196 may be re-rendered at a new orientation, as shown in FIG. 23, such that the dot product relationships are within the predetermined thresholds. In some embodiments, re-rendering the virtual content 196 at a new orientation may re-establish optimal dot product relationships between content orientation vectors (200, 202) and corresponding device orientation vectors (64, 67).

Figure 24:
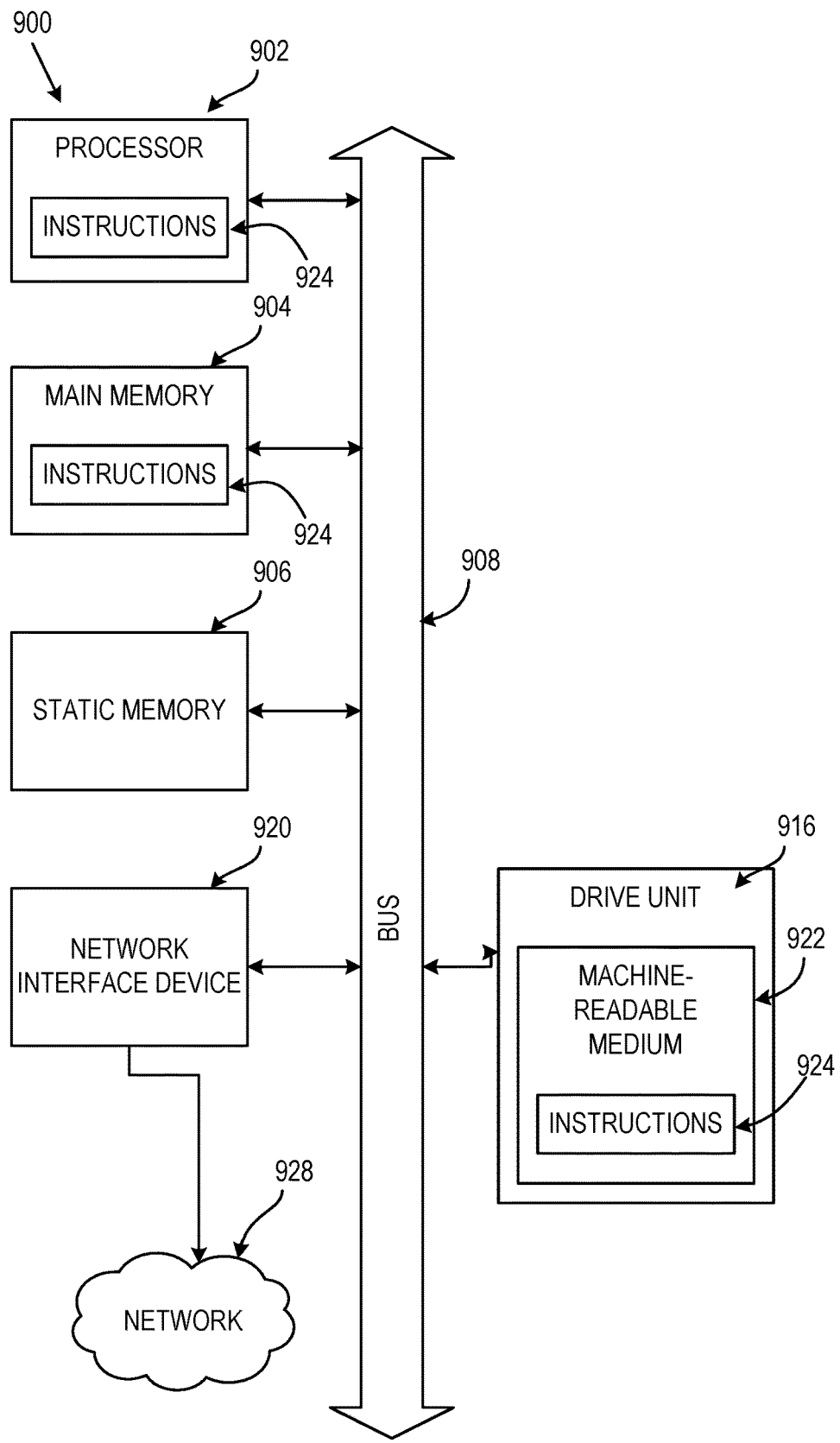
FIG. 24 is a block diagram of a machine in the form of a computer that can find application in the present invention system, in accordance with one embodiment of the invention.

FIG. 24 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a disk drive unit 916, and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the machine-readable medium 924 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. An augmented reality viewer comprising:
   a display that permits a user to see real world objects;
   a data channel to hold content;
   a user orientation determination module to determine a user orientation vector indicative of a first user orientation of a user relative to the first display area and to determine a second user orientation of the user relative to the first display area;

a projector connected to the data channel to display the content through the display to the user within confines of the first display area while the user views the real world objects;

a content vector calculator to calculate a content orientation vector relative to the near edge of the content; and a content orientation selection module connected to the user orientation determination module and the content vector calculator to display the content in a first content orientation relative to the first display area so that a near edge of the content is close to the user when the user is in the first user orientation, and display the content in a second content orientation relative to the first display area so that the near edge is rotated closer to the user when the user is in the second user orientation and the content is rotated relative to the first display area from the first content orientation, wherein the content orientation selection module determines four dot products, respectively (i) of the user orientation vector and the content orientation vector (ii) of a vector 90 degrees to the left of the user orientation vector and the content orientation vector (iii) of a vector 180 degrees from the user orientation vector and the content orientation vector (iv) of a vector 90 degrees to the right of the user orientation vector and the content orientation vector and rotates the content from the first orientation to a select orientation corresponding to a select one of the dot products that is the most positive.

2. The augmented reality viewer of claim 1, wherein the content orientation vector extends from the near edge of the content and the content rotates from the first content orientation to the second content orientation when the dot product becomes more in the second content orientation than in the first content orientation.

3. The augmented reality viewer of claim 1, further comprising:
a size determination module that resizes the content to fit the surface area in the first orientation and the second orientation.

4. The augmented reality viewer of claim 3, wherein the content has the same aspect ratio in the first orientation and in the second orientation.

5. The augmented reality viewer of claim 1, further comprising:
a surface area extraction module to determine the first display area.

6. The augmented reality viewer of claim 5, wherein surface area extraction module determines second surface area and the user orientation determination module to determine a first orientation of a user relative to the first surface area and the second surface area, further comprising:
a surface area selection module to select a preferred surface area between the first surface area and the second surface area based on normal to the respective surface area being directed more opposite to the first user orientation of the user, wherein the projector displays the content through the display to the user within confines of the preferred surface area while the user views the real world objects.

7. An augmented reality viewing method comprising:
determining, by the processor, a user orientation vector indicative of a first user orientation of a user relative to the first display area;

determining, by the processor, a first content orientation relative to the display when the user is in the first orientation;

displaying, by the processor, content in the first content orientation through a display to the user within confines of the first display area while the user views real world objects through the display while in the first user orientation;

calculating, by the processor, a content orientation vector relative to the near edge of the content;

determining, by the processor, a user orientation vector indicative of a second user orientation of the user relative to the first display area;

determining, by the processor, a second content orientation relative to the display when the user is in the second location;

determining, by the processor, four dot products, respectively (i) of the user orientation vector and the content orientation vector (ii) of a vector 90 degrees to the left of the user orientation vector and the content orientation vector (iii) of a vector 180 degrees from the user orientation vector and the content orientation vector (iv) of a vector 90 degrees to the right of the user orientation vector and the content orientation vector; and displaying, by the processor, content through a display to the user within confines of the display area while the user views real world objects through the display from the second location, wherein the content is rotated relative to the first display area from the first content orientation to a select orientation corresponding to a select one of the dot products that is the most positive.

\* \* \* \* \*